United States Patent
David

(10) Patent No.: US 11,886,955 B2
(45) Date of Patent: Jan. 30, 2024

(54) SELF-SUPERVISED DATA OBFUSCATION IN FOUNDATION MODELS

(71) Applicant: Protopia AI, Inc., Austin, TX (US)

(72) Inventor: Kurtis Evan David, Austin, TX (US)

(73) Assignee: Protopia AI, Inc., Austin, TX (US)

(*) Notice: Subject to any disclaimer, the term of this patent is extended or adjusted under 35 U.S.C. 154(b) by 0 days.

(21) Appl. No.: 18/303,454

(22) Filed: Apr. 19, 2023

(65) Prior Publication Data

US 2023/0259787 A1  Aug. 17, 2023

Related U.S. Application Data

(63) Continuation-in-part of application No. 18/170,476, filed on Feb. 16, 2023.

(60) Provisional application No. 63/420,287, filed on Oct. 28, 2022, provisional application No. 63/311,014, filed on Feb. 16, 2022.

(51) Int. Cl.
*G06N 3/0895* (2023.01)
*G06N 3/0455* (2023.01)

(52) U.S. Cl.
CPC ......... *G06N 3/0895* (2023.01); *G06N 3/0455* (2023.01)

(58) Field of Classification Search
CPC ....... G06N 3/0895; G06N 3/0455; G06N 3/08
See application file for complete search history.

(56) References Cited

U.S. PATENT DOCUMENTS

| | | | |
|---|---|---|---|
| 9,324,022 B2 | 4/2016 | Williams, Jr. et al. | |
| 10,043,035 B2 | 8/2018 | LaFever et al. | |
| 10,621,378 B1 | 4/2020 | Kim | |
| 10,621,379 B1 | 4/2020 | Kim | |
| 10,873,782 B2 | 12/2020 | Lomada et al. | |
| 10,956,598 B1 | 3/2021 | Lee | |
| 10,964,011 B2 | 3/2021 | Cosatto et al. | |
| 11,017,319 B1 | 5/2021 | Kim | |
| 11,017,320 B1 | 5/2021 | Kim | |
| 11,023,777 B1 | 6/2021 | Koo | |

(Continued)

FOREIGN PATENT DOCUMENTS

| | | |
|---|---|---|
| CN | 110603625 B | 9/2021 |
| CN | 109741736 B | 11/2022 |

(Continued)

OTHER PUBLICATIONS

Lecuyer M, Atlidakis V, Geambasu R, Hsu D, Jana S. Certified robustness to adversarial examples with differential privacy. In2019 IEEE symposium on security and privacy (SP) May 19, 2019 (pp. 656-672). IEEE. (Year: 2019).*

(Continued)

*Primary Examiner* — Michael J Huntley
*Assistant Examiner* — Oluwatosin O Alabi
(74) *Attorney, Agent, or Firm* — Pillsbury Winthrop Shaw Pittman, LLP

(57) ABSTRACT

Provided are methods and system for obtaining, by a computer system, a machine learning/machine learning model; obtaining, by the computer system, a training data set; training, with the computer system, an obfuscation transform based on the machine learning/machine learning model and the training data set; and storing, with the computer system, the obfuscation transform in memory.

29 Claims, 14 Drawing Sheets

(56) References Cited

U.S. PATENT DOCUMENTS

| | | |
|---|---|---|
| 11,164,046 B1 | 11/2021 | Kim |
| 11,200,342 B1 | 12/2021 | Kim et al. |
| 11,200,494 B1 | 12/2021 | Kim |
| 11,308,359 B1 | 4/2022 | Jeong et al. |
| 11,366,930 B1 | 6/2022 | Jeong et al. |
| 11,388,330 B1 | 7/2022 | Kim |
| 11,423,643 B1 | 8/2022 | Jeong |
| 11,514,323 B1 | 11/2022 | Hwang |
| 11,669,635 B1 | 6/2023 | Jeong |
| 2019/0251418 A1 | 8/2019 | Nakanishi et al. |
| 2020/0034520 A1 | 1/2020 | Kim |
| 2020/0034565 A1 | 1/2020 | Kim |
| 2020/0050962 A1 | 2/2020 | Kim |
| 2020/0201957 A1 | 6/2020 | Kim |
| 2021/0075798 A1 | 3/2021 | Krasser et al. |
| 2021/0085195 A1 | 3/2021 | Dormer et al. |
| 2021/0390188 A1 | 12/2021 | Mireshghallah et al. |
| 2022/0059196 A1* | 2/2022 | Lee ................ G06N 3/047 |
| 2022/0108213 A1* | 4/2022 | Cao ................. G06N 3/084 |
| 2022/0172050 A1* | 6/2022 | Dalli ................ G06N 3/08 |
| 2022/0269928 A1* | 8/2022 | Esmaeilzadeh ...... G06N 3/044 |
| 2023/0007985 A1 | 1/2023 | Kim |
| 2023/0019228 A1 | 1/2023 | Abadi et al. |

FOREIGN PATENT DOCUMENTS

| | | |
|---|---|---|
| EP | 3534283 A1 | 9/2019 |
| EP | 3534284 A1 | 9/2019 |
| KR | 102035796 B1 | 10/2019 |
| KR | 102107021 B1 | 5/2020 |
| KR | 102473801 B1 | 12/2022 |
| TW | 1707300 B | 10/2020 |

OTHER PUBLICATIONS

Li D, Li Q, Ye Y, Xu S. A framework for enhancing deep neural networks against adversarial malware. IEEE Transactions on Network Science and Engineering. Jan. 13, 2021;8(1):736-50. (Year: 2021).*

Singh M, Nagpal S, Singh R, Vatsa M. Disguise resilient face verification. IEEE Transactions on Circuits and Systems for Video Technology. Oct. 15, 2021;32(6):3895-905. (Year: 2021).*

Popovic N, Paudel DP, Probst T, Van Gool L.Stochastic Layers in Vision Transformers arXiv preprint arXiv:2112.15111. Dec. 30, 2021. (Year: 2021).*

Malekzadeh M, Clegg RG, Haddadi H. Replacement autoencoder: A privacy-preserving algorithm for sensory data analysis. arXiv preprint arXiv:1710.06564. Oct. 18, 2017. (Year: 2017).*

Leroux S, Verbelen T, Simoens P, Dhoedt B. Privacy aware offloading of deep neural networks. arXiv preprint arXiv:1805.12024. May 30, 2018. (Year: 2018).*

Feldmann A, Samardzic N, Krastev A, Devadas S, Dreslinski R, Eldefrawy K, Genise N, Peikert C, Sanchez D. F1: A fast and programmable accelerator for fully homomorphic encryption (extended version). arXiv preprint arXiv:2109.05371. Sep. 11, 2021. (Year: 2021).*

Zheng, Liang, et al. "Scalable person re-identification: A benchmark." Proceedings of the IEEE international conference on computer vision. 2015.

Zhong, Zhun, et al. "Re-ranking person re-identification with k-reciprocal encoding." Proceedings of the IEEE conference on computer vision and pattern recognition. 2017.

Zhou et al., Torchreid: A library for deep learning person re-identification in pytorch, Oct. 22, 2019.

Rombach et al., High-resolution image synthesis with latent diffusion models, 2021.

Ahonen et al., Face Recognition with Local Binary Patterns, ECCV 2004, LNCS 3021, pp. 469-481, 2004.

Alao et al., How Meta is working to assess fairness in relation to race in the U.S. across its products and systems, MetaAI, Nov. 2021.

AWS Inferentia, © 2023, Amazon Web Services, Inc., downloaded Jun. 29, 2023.

Phong et al., Privacy-Preserving Deep Learning via Additively Homomorphic Encryption, National Institute of Information and Communications Technology (NICT), ATIS 2017.

Belhumeur et al., Eigenfaces vs. Fisherfaces: Recognition Using Class Specific Linear Projection, IEEE Transactions on Pattern Analysis and Machine Intelligence, vol. 19, No. 7, Jul. 1997.

Boemer et al., MP2ML: A Mixed-Protocol Machine Learning Framework for Private Inference, ARES 2020, Aug. 25-28, 2020, Virtual Event, Ireland.

Brown et al., Language Models are Few-Shot Learners, Jun. 5, 2020.

Chaudhuri et al., Near-optimal differentially private principal components. Advances in neural information processing systems 25, 2012.

Chaudhuri et al., Privacy-preserving logistic regression, Advances in neural information processing systems 21, 2008.

Chopra et al., Learning a similarity metric discriminatively, with application to face verification. In 2005 IEEE computer society conference on computer vision and pattern recognition (CVPR'05) (vol. 1, pp. 539-546), IEEE, Jun. 2005.

Cuff et al., Differential privacy as a mutual information constraint, in Proceedings of the 2016 ACM SIGSAC Conference on Computer and Communications Security, pp. 43-54. 2016.

Davoudi et al., Intelligent ICU for Autonomous Patient Monitoring Using Pervasive Sensing and Deep Learning, Scientific Reports, Published May 29, 2019.

Devlin et al., BERT: Pre-training of Deep Bidirectional Transformers for Language Understanding, Oct. 11, 2018.

Dosovitskiy et al., An image is worth 16×16 words: Transformers for image recognition at scale, Oct. 22, 2020.

Dwork, C., Differential privacy. In International colloquium on automata, languages, and programming (pp. 1-12). Berlin, Heidelberg: Springer Berlin Heidelberg. Jul. 2006.

Mireshghallah et al., A Principled Approach to Learning Stochastic Representations for Privacy in Deep Neural Inference, Mar. 26, 2020.

Gentry, C., A Fully Homomorphic Encryption Scheme, Sep. 2009.

Gilad-Bachrach et al. Cryptonets: Applying neural networks to encrypted data with high throughput and accuracy, International conference on machine learning. PMLR, 2016.

Huang et al., Labeled faces in the wild: A database for studying face recognition in unconstrained environments, Workshop on faces in 'Real-Life' Images: detection, alignment, and recognition. 2008.

Kanade, T., Picture Processing System by Computer Complex and Recognition of Human Faces (Dissertation_ ), Issue date May 23, 1974.

Kelly, Michael David. Visual identification of people by computer. Stanford University, 1971.

Knott, Brian, et al., Crypten: Secure multi-party computation meets machine learning, Advances in Neural Information Processing Systems 34 (2021): 4961-4973.

Leroux et al., Privacy aware offloading of deep neural networks, May 30, 2018.

Liao et al., A general framework for information leakage, 2017.

Lowe, David G., Distinctive Image Features from Scale-Invariant Keypoints, Jan. 5, 2004.

Papernot et al., Semi-supervised knowledge transfer for deep learning from private training data, Oct. 18, 2016.

Parkhi et al., Deep face recognition, BMVC 2015—Proceedings of the British Machine Vision Conference 2015. British Machine Vision Association, 2015.

Paszke et al., Pytorch: An imperative style, high-performance deep learning library, Advances in neural information processing systems 32, 2019.

Radford et al., Learning transferable visual models from natural language supervision, International conference on machine learning. PMLR, 2021.

Reagen et al., Cheetah: Optimizing and accelerating homomorphic encryption for private inference, 2021 IEEE International Symposium on High-Performance Computer Architecture (HPCA). IEEE, 2021.

(56) References Cited

OTHER PUBLICATIONS

Reddi et al., On the convergence of adam and beyond, 2019.
Bommasani et al., On the opportunities and risks of foundation models, Aug. 16, 2021.
Samardzic et al., F1: A fast and programmable accelerator for fully homomorphic encryption, InMICRO-54: 54th Annual IEEE/ACM International Symposium on Microarchitecture (pp. 238-252), Oct. 18, 2021.
Schroff et al., Facenet: A unified embedding for face recognition and clustering, Proceedings of the IEEE conference on computer vision and pattern recognition, 2015.
Simonyan et al., Very deep convolutional networks for large-scale image recognition, Sep. 4, 2014.
Sirovich et al., Low-dimensional procedure for the characterization of human faces, Josa a 4.3 (1987): 519-524.
Spanoudes et al., Deep learning in customer churn prediction: unsupervised feature learning on abstract company independent feature vectors, Mar. 10, 2017.
Sun et al., Deep learning face representation from predicting 10,000 classes, Proceedings of the IEEE conference on computer vision and pattern recognition. 2014.
Taigman et al., Deepface: Closing the gap to human-level performance in face verification, Proceedings of the IEEE conference on computer vision and pattern recognition. 2014.
Do et al., A theoretically sound upper bound on the triplet loss for improving the efficiency of deep distance metric learning, Proceedings of the IEEE/CVF Conference on Computer Vision and Pattern Recognition. 2019.
Vaswani et al., Attention is all you need, Advances in neural information processing systems 30, 2017.
Wang et al., Not just privacy: Improving performance of private deep learning in mobile cloud, Proceedings of the 24th ACM SIGKDD international conference on knowledge discovery & data mining. Jul. 19, 2018.
Wang et al., High-frequency component helps explain the generalization of convolutional neural networks, Proceedings of the IEEE/CVF conference on computer vision and pattern recognition. 2020.
Wankhede et al., Just walk-out technology and its challenges: A case of Amazon Go, 2018 International Conference on Inventive Research in Computing Applications (ICIRCA). IEEE, Jul. 11, 2018.
Weinberger et al., Distance metric learning for large margin nearest neighbor classification, Advances in neural information processing systems 18, 2005.
Ye et al., Deep learning for person re-identification: A survey and outlook, IEEE transactions on pattern analysis and machine intelligence 44.6, 2021.
Yi et al., Learning face representation from scratch, Nov. 28, 2014.
Yonetani et al., Privacy-preserving visual learning using doubly permuted homomorphic encryption, Proceedings of the IEEE international conference on computer vision. 2017.
Gorishniy et al., Revisiting deep learning models for tabular data, Advances in Neural Information Processing Systems 34, 2021.

\* cited by examiner

SELF-SUPERVISED DATA OBFUSCATION IN FOUNDATION MODELS

CROSS-REFERENCE TO RELATED APPLICATIONS

This application is a continuation-in-part of U.S. patent application Ser. No. 18/170,476, titled OBFUSCATION OF ENCODED DATA WITH LIMITED SUPERVISION, filed 16 Feb. 2023, which claims the benefit of U.S. Provisional Patent Application 63/311,014, titled QUASI-SYNTHETIC DATA GENERATION FOR MACHINE LEARNING MODELS, filed 16 Feb. 2022, and claims the benefit of U.S. Provisional Patent Application 63/420,287, titled SELF-SUPERVISED DATA OBFUSCATION, filed 28 Oct. 2022, the entire content of each of which is hereby incorporated by reference.

BACKGROUND

Machine learning models including neural networks have become the backbone of intelligent services and smart devices. To operate, the machine learning models may process input data from data sources, like cameras, microphones, unstructured text, and output classifications, predictions, control signals, and the like.

Generally, the machine learning models are trained on training data. Training data may itself be sensitive in some cases. For example, training data may be expensive to generate and serve as a valuable trade secret. Further, training data may contain information burdened with confidentiality or privacy obligations, including information that an entity is legally obligated to protect from disclosure to third parties.

SUMMARY

The following is a non-exhaustive listing of some aspects of the present techniques. These and other aspects are described in the following disclosure.

Some aspects include application of a stochastic layer in a machine learning model and/or autoencoder.

Some aspects include a tangible, non-transitory, machine-readable medium storing instructions that when executed by a data processing apparatus cause the data processing apparatus to perform operations including the above-mentioned application.

Some aspects include a system, including: one or more processors; and memory storing instructions that when executed by the processors cause the processors to effectuate operations of the above-mentioned application.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
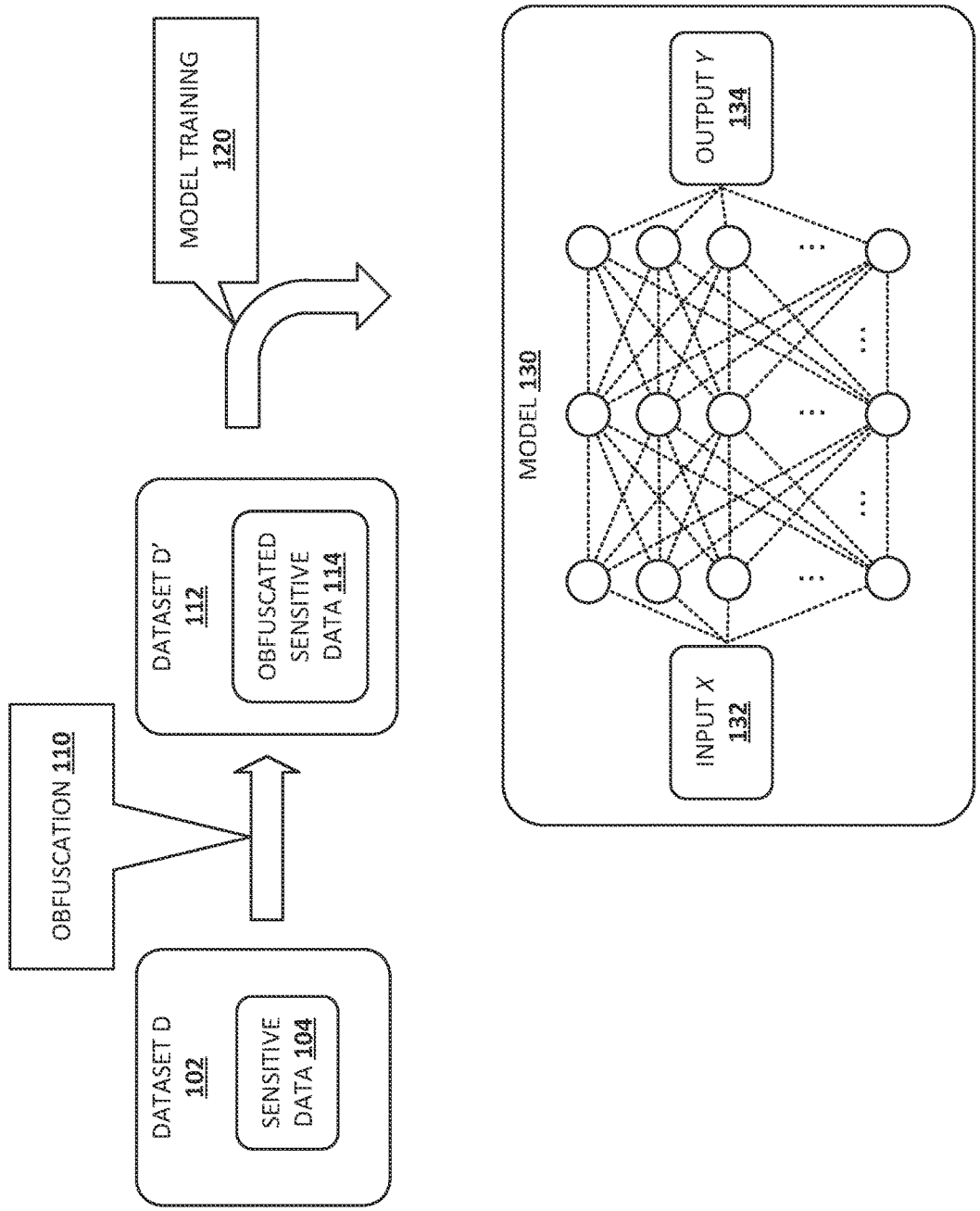
FIG. 1 depicts an example machine learning model trained using an obfuscated dataset, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of machine learning and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some approaches to obfuscating data require that a trained model be available when configuring the obfuscation process. However, in some cases, that trained model is not available, e.g., when data is being offered to third parties that will not share their models, when the model has not yet been created, or when the model architecture is expected to change in ways that are difficult to predict. The issue is particularly acute for training data, which generally exists independently from the models for which it is to be used for training.

To mitigate these issues or others, some embodiments obfuscate training data in a way that leaves the obfuscated training data suitable for training a machine learning model but conceals the un-obfuscated version of the training data. Some embodiments train a model that obfuscates training data, referred to herein as an obfuscator. To train the obfuscator, some embodiments obtain training data, train an autoencoder on the training data, and learn parameters of parametric noise distributions of inserted noise layers (e.g., upstream of the decoder, such as after the latent representation is formed). The parametric noise distributions may be learned with the techniques described in U.S. patent application Ser. No. 17/458,165, filed 26 Aug. 2021, titled METHODS OF PROVIDING DATA PRIVACY FOR NEURAL NETWORK BASED INFERENCE, the contents of which are hereby incorporated by reference, with the decoder or other downstream part of the autoencoder serving the role of the machine learning model into which obfuscated data is input in the reference. The trained obfuscator may then ingest records of the training data and output obfuscated versions of those records, e.g., from intermediate stages of the autoencoder augmented with the inserted noise layers, such as by pruning the decoder and outputting obfuscated data from a noise layer downstream of the latent representation. In some embodiments, the autoencoder may instead or additionally be another type of neural network or other machine learning algorithm which generated encodings (e.g., embeddings). Hereinafter, any reference to an autoencoder should be understood to also encompass a neural network which generates embeddings.

Obfuscated records may be obfuscated in two senses. First, the intermediate stages of the autoencoder may transform the input data into a form from which the input data cannot be re-created, such as by lower-dimensional intermediate layers that implement, in effect, a lossy compression of input data. Second, the noise layers may inject noise by randomly sampling from learned parametric noise distributions (e.g., for each dimension of the respective layer) corresponding to each dimension of the intermediate layer's intermediate representation of the input (e.g., latent representation) and combining the sampled noise with the respective dimension's value, e.g., by adding, subtracting, dividing, multiplying, or other combinations that maintain differentiability of the objective function used to learn the parametric noise distributions, in some embodiments. In some embodiments, the obfuscator may be trained without having access to the model the obfuscated training data is to be used to train.

Some embodiments quantify a maximum (e.g., approximation or exact local or global maximum) perturbation to a training data set for generation of an obfuscated training data set input to a model's training process that will allow the model to be correctly trained successfully (e.g., satisfying a threshold metric for model performance) on the obfuscated training data set. Some embodiments afford a technical solution to training data obfuscation formulated as a gradient based optimization of parametric noise distributions (e.g., using a differentiable objective function (like a loss or fitness function), which is expected to render many use cases computationally feasible that might otherwise not be) implemented, in some cases, as a loss function over a pre-trained autoencoder. The outcome of training the obfuscator may be a loss expressed as a maximum perturbation that causes a minimum loss across a machine learning model, which may be an autoencoder. The loss may be determined to find a maximum noise value that may be added (or otherwise combined, like with subtraction, multiplication, division, etc.) at one or more layer of the machine learning model to produce an obfuscated training data set that may be used to train a subsequent machine learning model. Some embodiments may produce obfuscated training data that may be applied to train various machine learning models, such as neural networks operating on image data, audio data, or text for natural language processing.

Some embodiments measure training data sets susceptibility to noise addition. To this end, some embodiments determine a maximum perturbation that may not cause mis-training of a machine learning model. In some embodiments, a tensor of random samples from a normal distribution (or one or more other distributions e.g., Gaussian, Laplace, binomial, or multinomial distributions) may be added to (or otherwise combined with) the input tensor X to determine a maximum variance value to the loss function of the neural network or autoencoder.

Machine learning algorithms consume data during training and, after training (or during active training), at runtime, generally without sample data being processed in the latter category. Training data may include sensitive data that parties would like to keep confidential for various reasons. For instance, in many federated learning use cases, an untrained or partially trained model may be distributed to other computing devices with access to data to be used for training, and then in some cases, those distributed machines may report back the updates to the model parameters (or simply execute the trained model locally on novel data without reporting model parameters back). In some cases, during training, the model is on a different network, computing device, virtual address space, or protection ring of an operating system relative to a data source. This may increase the attack surface for those seeking access to such data and lead to the exposure of the data, which may reveal proprietary information or lead to privacy violations. A single compromised computing device could expose the data upon which that computing device trains the model. Similar issues may arise in applications training a model on a single computing device. Training data may be exposed to attach or capture during transfer and across various machines where it is used for training, including updating, active learning, batch training, etc.

To mitigate these or other issues, some embodiments obfuscate training data. The transformed, or obfuscated, data set may have two characteristics: (1) sensitive data may be obfuscated and (2) sufficiently accurate machine learning models may be trained using the transformed or obfuscated data set. In some cases, the amount of noise and dimensionality of intermediate layers of the autoencoder may be tuned according to tradeoffs between obfuscation and accuracy, with greater dimensionality and lower noise being expected to afford greater accuracy and reduced obfuscation, and vice versa. The transformed or obfuscated data set may then be used as training data for a model, where the training data does not disclose sensitive information if disclosed to an adversary. In some cases, the un-obfuscated training data is not accessible to the model (e.g., from the process training the model), which may also be trained in a distributed method or using other security measures. In some embodiments, a maximum noise or stochastic layer parameters are determined for which a minimum perturbation to model training is expected. The maximum noise may be determined based on a loss function in some cases.

In some embodiments, the training data set, herein also referred to as dataset D, may be decomposed. The dataset D may contain multiple records, each with features X and, in some cases, like in supervised learning use cases, labels $Y_j$. The labels $Y_j$ may be one or more downstream labels. The dataset D may be any appropriate dataset, such as tabular data, images, audio files, formatted or unformatted natural language or structured text, etc. The transformation of the dataset D into the obfuscated training data, herein also referred to as dataset D', may be performed independent of the model (e.g., machine learning model) that is to be trained based on the dataset D and which is thereby replaced in training by the dataset D'.

Some embodiments determine a maximum noise independent of the machine learning model. In some embodiments, the transformation is applied to the dataset D independently of Y (e.g., independently of any labels or downstream labels). In some embodiments, the transformation may include removal of Y (e.g., removal of labels), such that a model trained on the dataset D may be trained in an unsupervised manner. The obfuscator performing the transformation may be characterized as an unsupervised machine learning model. In order to determine a maximum noise that may be applied to the dataset D using gradient descent (such as stochastic gradient descent or other gradient based optimization) or another appropriate method, an autoencoder may be trained on the dataset D. Various autoencoders may be used, including transformer architectures. The autoencoder may not be the machine learning model to be trained with the obfuscated data (e.g., the machine learning model that is to be trained on the training data/dataset D to generate accurate output). The autoencoder may be independent of (e.g., trained in the absence of) the machine learning model to be trained on obfuscated data and may be used to generate obfuscated training data for training various heterogenous machine learning models or for other applications.

In some embodiments, the autoencoder may include two models in a pipeline, an encoder and a decoder, and in some cases, dimensionality of intermediate layers may be different from inputs and outputs of the autoencoder, e.g., with a bottleneck layer between the two that has lower dimensionality than the input or output. The autoencoder may be a neural network. The encoder may be a model or a portion of a model that reduces the dimensionality of the elements (or other records) of the dataset D, or alternatively, the dimensionality of the elements may be increased or maintained. The encoder may produce a latent representations of the elements of the dataset D, e.g., inputting a record with a first dimensionality may produce a latent representation with different dimensionality. The latent representations may be the representations of the elements of the dataset D at the bottleneck layer. The encoder may operate on individual elements of the dataset D, e.g., produce obfuscated data elements one at a time, or may operate on a batch of elements of the dataset D at once. In some embodiments, the decoder may be a model or portion of a model that increases the dimensionality of a latent representation output by the encoder, or, alternatively, the dimensionality of the elements may be reduced or maintained. The decoder may likewise operate on individual elements or batches of elements of the dataset D. The decoder may take as input the output of the encoder. The autoencoder may include a bottleneck layer, which may be a connection between the encoder and decoder. In some embodiments, the encoder may implement a form of lossy compression of inputs. A difference between the output of the autoencoder and the input of the autoencoder may be determined and minimized during training, such as by using reconstruction loss measurement. In some embodiments, the autoencoder may be trained with a differentiable objective function using gradient descent. The autoencoder may be trained based on reconstruction loss minimization.

Once the autoencoder is trained, the output of the encoder may be used to generate obfuscated training data, e.g., the dataset D'. In some embodiments, the output of the encoder may be used to generate the dataset D'.

In some embodiments, further obfuscation is provided by learning a set of noise distributions that, when applied to intermediate representations of data, still yield acceptable accuracy of the trained decoder or a trained model (e.g., trained on the obfuscated data). A noise layer (also referred to as stochastic noise layer) may be applied to the encoded representations of the elements of the dataset D in order to generate the dataset D'. The noise layer may be applied to one or more encoded representations of the data, such as the latent representation, a representation at the bottleneck layer, a hidden layer representation layer, etc. One or more stochastic noise layer may be used. A stochastic noise layer may be used to apply noise to the latent representations of the elements of the dataset D at the bottleneck layer. The noise layer may include parametric noise distributions, which may be normal distributions, binomial distributions, multinomial distributions, Gaussian distributions, etc. of noise. The noise layer may include noise values and/or a noise distribution for each component or each dimension of the representation of the elements of the dataset D at the layer where the stochastic noise is applied, or for a subset. For example, the noise layer may apply a value sampled from a noise distribution to each component of the latent representation at the bottleneck layer. Thus, inputting the same value twice is expected to yield different obfuscated outputs, as randomly sampling from the learned noise distributions is expected to produce different values each time. The stochastic noise layer may apply noise to some components of the representation of the dataset D and not others and may apply different distributions and intensities of noise to one or more components of the representation of the dataset D at each stochastic noise layer. In some cases, noise may be additive, subtractive, multiplicative, or divisive or any combination of these mathematical operations. The added noise may be linear, super linear, sublinear, a ratio, etc. The noise may be nonlinear noise. The parameters of the noise may be determined for a maximum obfuscation with minimum additional reconstruction losses using the techniques discussed above and in U.S. patent application Ser. No. 17/458,165. The noise parameters may be determined based on stochastic gradient descent, or any other appropriate method.

Once the noise layer has been trained, sections of the autoencoder may be pruned, e.g., the decoder. The encoder, together with one or more stochastic layers, may be used to generate obfuscated training data set, e.g., dataset D', D", etc., such that the un-obfuscated training data set D is protected from disclosure to a party that merely has D'. For example, the encoder may execute at a trusted position on the repository of training data to generate an obfuscated dataset D', which is then transmitted or otherwise communicated to a model training algorithm in an untrusted environment. In some embodiments, the encoder may operate within the envelope of the training data or trusted storage vehicle and encode training data before it leaves the trusted envelope, where the trusted envelope may be a storage location, a customer site, etc. The terms "trusted' and "untrusted" are not used in the subjective sense, and no state of mind or judgement is required. Rather the terms refer to distinct computing environments where privileges in one do not necessarily afford full access in the other.

The encoder may also be used to generate augmented training data, where the stochastic noise layer may generate one or more distributions which may be used to generate multiple obfuscated elements for the dataset D' from one element of the dataset D. Each of the elements of the obfuscated dataset D' may be generated based on one element of the dataset D. In this way data of the obfuscated dataset D' may be characterized as being quasi-synthetic, e.g., realistic but obfuscated, and not necessarily synthetic, such as a randomized stochastic re-representation of the data. Parameters of the elements of the dataset D' may be quasi-synthetic (e.g., obfuscated, noisy, or otherwise not measured quantities) but the elements of the dataset D' may correspond to single elements, such as a tensor X, or the original dataset D. Components of various elements, (e.g., tensors X) may not be swapped between each other to generate fully synthetic data which may or may not be realistic. For example, a tensor (Xa1, Xb1) and a tensor (Xa2, Xb2) may be used to generate obfuscated data (Xa1', Xb1') and (Xa2', Xb2') but not (Xa1, Xb2) or (Xa2, Xb1). As data is quasi-synthetic, a model may be trained on the dataset D' as if the obfuscated dataset D' was the un-obfuscated dataset D.

In some embodiments, additional constraints may be applied through noise regularization. For example, a sensitive parameter may be regularized or made uniform such that the parameter is not present and/or cannot be reconstructed from the dataset D'. Regularization may also be used to reduce bias. An adversarial loss model or an adversarial term may be added to prevent another model from predicting sensitive attributes which have been obscured. For example, for tabular data an element representing gender may be regularized, such that the dataset D' has a normalized and/or uniform distribution of gender variables. Based on data security requirements and/or data engineering, features which are to be regularized and/or removed may be identified. In some cases, a feature, such as gender, may also influence other features of the data, such as occupation. In order to fully obfuscate one feature, additional features may also be regularized. The rate of regularization or amount of obfuscation may depend on data security needs and/or on the relationship and dependence between features.

In some cases, a maximum noise applied in a stochastic noise layer may also be determined based on a subsequent machine learning model. A machine learning model trained on obfuscated dataset D' may be tested for error, based on a test accuracy, a test data set, a validation data set, etc. In instances where the subsequent machine learning model accuracy is affected by the stochastic noise layer, the noise layer may be reduced or adjusted in order to produce an obfuscated dataset valid for model training. In some embodiments, the autoencoder may also or instead be retrained.

Some embodiments augment otherwise deterministic autoencoders and/or neural networks with stochastic conditional noise layers. Examples with stochastic noise layers include architectures in which the parameters of the layers (e.g., layer weights) are each a distribution (from which values are randomly (which includes pseudo-randomly) drawn to process a given input) instead of deterministic values. In some examples, the parameters of the layers (e.g., layer weights) are single values but when applied to their inputs instead of generating the output of the layer, the output of the layer sets the parameters of a set of corresponding distributions that are sampled from to generate the output. In some cases, a plurality of parallel stochastic noise layers may output to a downstream conditional layer configured to select an output (e.g., one output, or apply weights to each in accordance with relevance to the classification) among the outputs of the upstream parallel stochastic noise layers. In some cases, for a given input, one parallel stochastic noise layer may be upweighted in one sub-region of the given input (like a collection of contiguous pixels in an image) while another parallel stochastic noise layer is down weighted in the same sub-region, and then this relationship may be reversed in other sub-regions of the same given input.

In some embodiments, un-obfuscated training data may reside at a "trusted" computing device, process, container, virtual machine, OS protection ring, or sensor, and training may be performed on an "untrusted" computing device, process, container, virtual machine, or OS protection ring. The term "trust" in this example does not specify a state of mind, merely a designation of a boundary across which training data information flow from trusted source to untrusted destination is to be reduced with some embodiments of the present techniques. The training data may be encoded by the encoder of the autoencoder together with the stochastic noise layers. When the autoencoder is trained, the encoder may be constrained versus the decoder so that the encoder requires smaller computing time/energy than the decoder (e.g., such that the encoder contains smaller or fewer layers than the decoder). As the encoder may be added to the secure data storage and operate upon the trusted training data before the training data is transmitted or used, a smaller encoder is computationally advantageous. The data may be obfuscated through the stochastic operation of the layer, through random selection of distributions corresponding to model parameters, as discussed elsewhere herein. The obfuscated training data may be proved to the untrusted destination where model training continues on the obfuscated data. Consequently, the untrusted computing device, process, container, virtual machine, or OS protection ring performing training is prevented from, and need not, access the un-obfuscated training data.

Reference to "minimums" and "maximums" should not be read as limited to finding these values with absolute precision and includes approximating these values within ranges that are suitable for the use case and adopted by practitioners in the field. It is generally not feasible to compute "minimums" or "maximums" to an infinite number of significant digits and spurious claim construction arguments to this effect should be rejected.

The forgoing embodiments may be implemented in connection with example systems and techniques depicted in FIGS. 1-8. It should be emphasized, though, that the figures depict certain embodiments and should not be read as limiting.

Machine learning models have emerged as powerful and effective solutions for a variety of tasks from e-commerce to healthcare. In a number of use-cases, machine learning algorithms, particularly Deep Neural Networks, have even surpassed human performance. As such, these models have penetrated everyday applications such as voice assistants and aspire to even unlock self-driving cars and delivery services. To this end, the security of the data used to train these models and their susceptibility to any form of malevolent actions needs to be considered with utmost rigor.

Data obfuscation may be presented as a gradient-based optimization that defines a loss function over a pre-trained machine learning model. This loss may be defined as finding the minimum perturbation (noise) over the input to the model that causes minimum reconstruction losses in the objective of the model without changing its parameters. For instance, find the maximum perturbation that causes minimum reconstruction loss without changing the weights of the model. Some embodiments are described as applied to neural network models. The idea is not limited to any specific type of neural network or data type. For instance, it may be applied on neural networks that operate on image data for vision tasks. Or it may be applied to neural networks that process text of an email to detect whether or not it is spam. These are just examples of use-cases and the technique is general and may be applied to other types of models.

FIG. 1 depicts an example machine learning model 130 trained using an obfuscated dataset D' 112. The machine learning model 130 may be trained by any appropriate training method, including model training 120. The machine learning model 130 may operate on an input X 132, which may be an element of the obfuscated dataset D' 112. The machine learning model 130 may output an output Y 134 based on the input. The machine learning model may be any appropriate machine learning model.

The obfuscated dataset D' 112 may be an obfuscated version of the dataset D 102. The dataset D 102 may contain sensitive data 104 (e.g., data which is identified as to be obfuscated, including partially, fully, removed from inference-ability, etc.). The dataset D 102 may contain labels for at least some of the dataset D 102. The dataset D 102 may be an unlabeled dataset. An obfuscation operation 110 may be performed on the dataset D 102 to produce the obfuscated dataset D' 112. The obfuscation operation 110 may remove the sensitive data 104 from the obfuscated dataset D' 112 (or generated an obfuscated version of the sensitive data, such as obfuscated sensitive data 114). If the dataset D 102 contains labels, the obfuscated dataset D' 112 may also contain labels, which labels may also be obfuscated. Each element of the dataset D 102 may be used to create one or more element of the obfuscated dataset D' 112. For example, by application of stochastic noise, which may be sampled multiple times creating different values, an element of the dataset D 102 may be used to generate multiple elements of the obfuscated dataset D' 112. The obfuscated dataset D' 112 may be used to train the machine learning model 130.

Figure 2A:
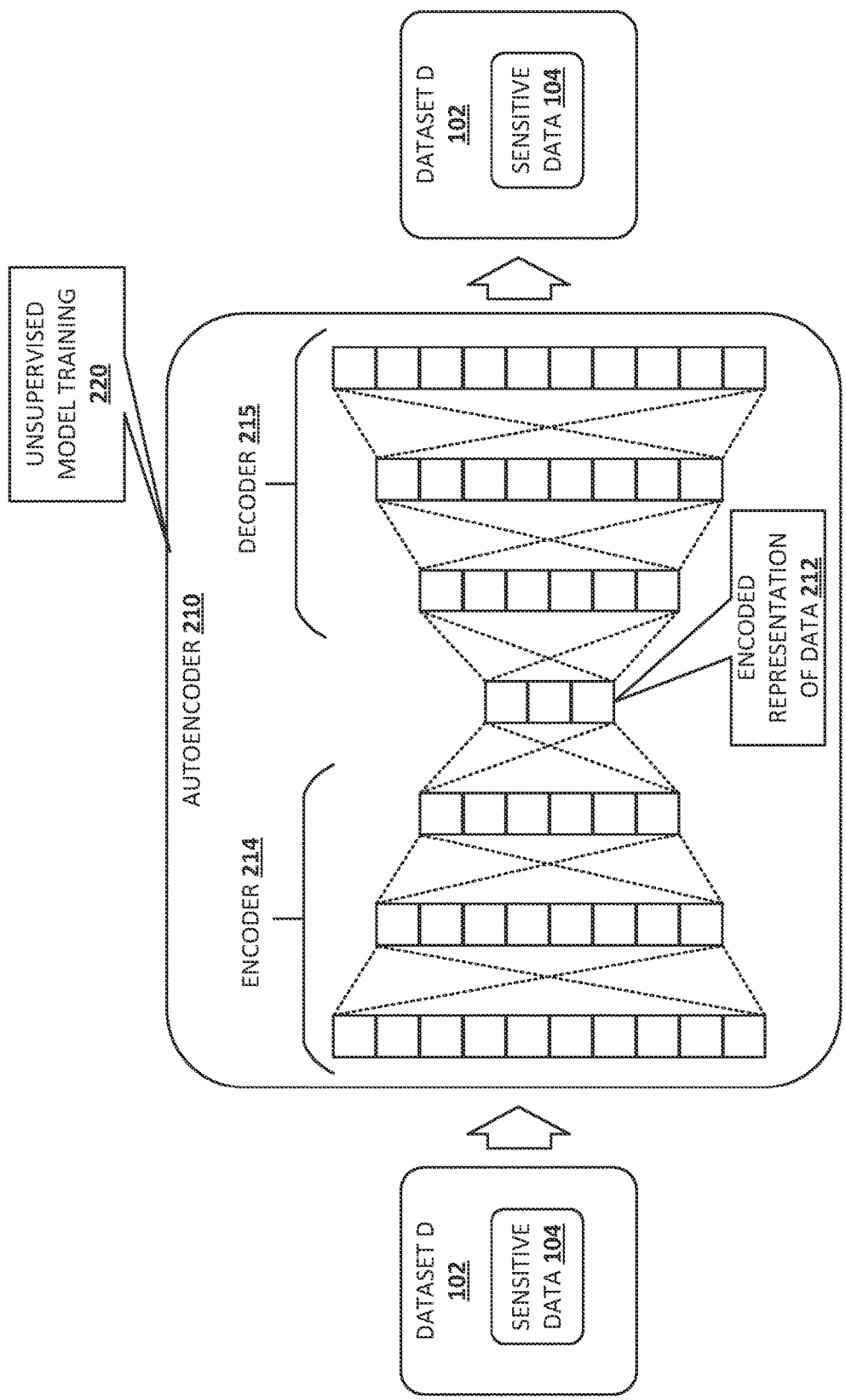
FIG. 2A depicts a system for encoding a representation of data, in accordance with some embodiments.

FIG. 2A depicts a system for encoding a representation of data using an autoencoder 210. The dataset D 102 may be used to train an autoencoder. The dataset D 102 may be used without labels, e.g., in an unsupervised manner, to train the autoencoder to generate an encoded representation of data 212. The encoded representation of data 212 may be a latent representation. The autoencoder 210 may contain an encoder 214 and a decoder 215, which may operate upstream and downstream of a bottleneck layer. The autoencoder may be trained, using an appropriate method of unsupervised model training 220, to generate an output of dataset D 102 based on an input of dataset D 102. The autoencoder 210 may be trained using a reconstruction loss function.

Figure 2B:
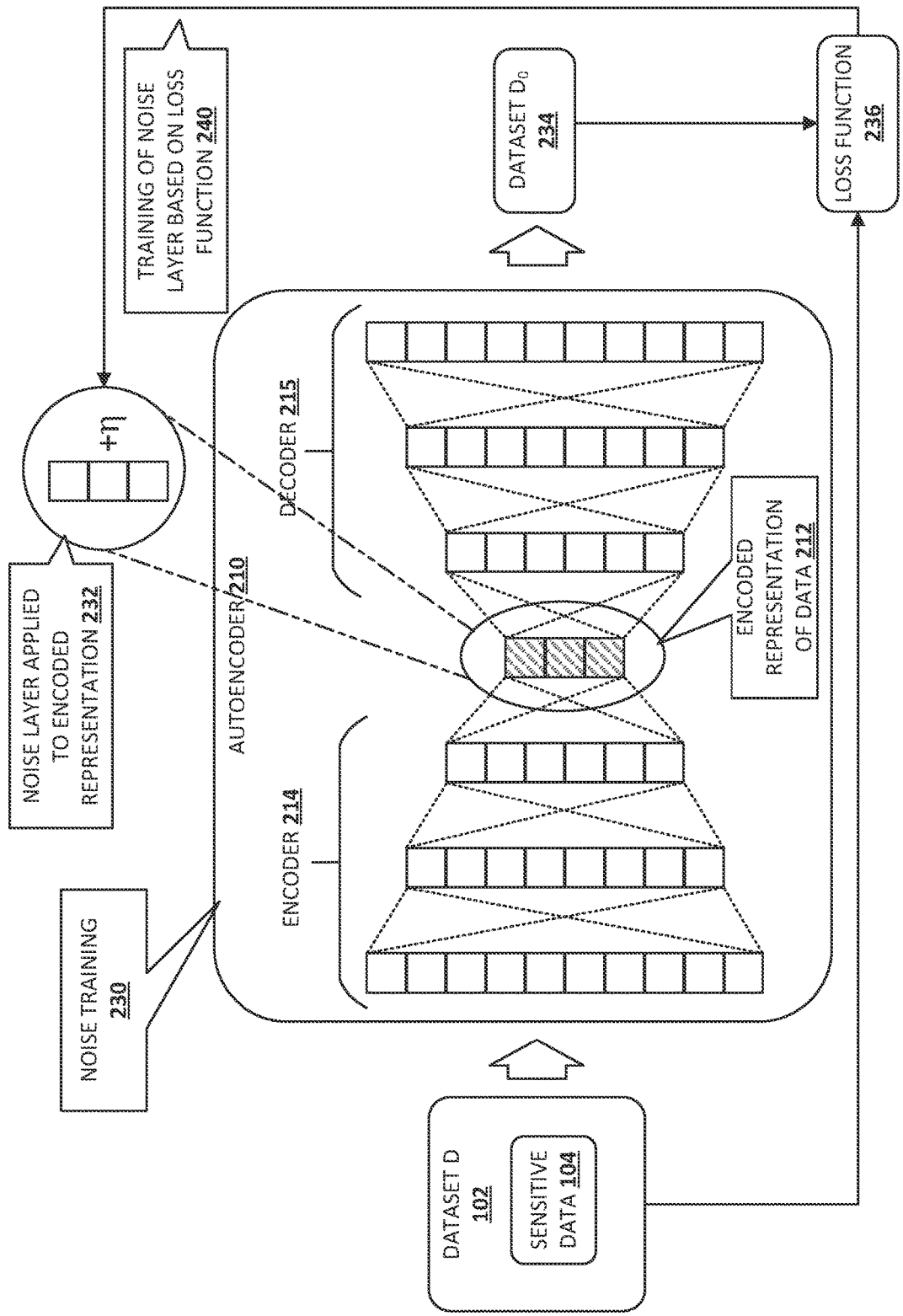
FIG. 2B depicts a system for applying noise to an encoded representation of data, in accordance with some embodiments.

FIG. 2B depicts a system for applying noise to an encoded representation of data in the autoencoder 210. Noise, which may be in the form of a stochastic noise layer, may be applied to an encoded representation of the data 212 within the autoencoder 210. An application of noise to the bottleneck layer is depicted, but noise may be applied at one or more layer which may or may not be the bottleneck layer. The noise applied to the encoded representation 232 may be trained (e.g., in noise training 230), such as by using a loss function 236. An example loss function is depicted in Equation 1, below:

$$\min_{\eta} \mathbb{E}_{X \sim D}[\mathcal{R}(X \mid \theta, \eta) + \alpha \mathcal{L}_{noise}(\eta)] \quad (1)$$

where $\mathcal{R}$ is a reconstruction loss, such as may be used to train an autoencoder, $\theta$ are the autoencoder parameters, $\eta$ are the noise parameters, a is an adjustable noise tuning parameter, and $\mathcal{L}_{noise}$ is a loss due to noise. The loss function, or another appropriate optimization objective, may be minimized (or maximized if a gain function is used) to determine parameters for the noise. The loss function 236 may be determined based on input of elements of the dataset D 102 into the autoencoder 210, with the noise layer applied to the encoded representation of data 212, which may produce an output dataset D0 234. The output dataset D0 234 and the dataset D 102 may be used to determine values of the loss function 236. The noise layer applied to the encoded representation 232 may be trained based on the loss function 240.

Figure 3:
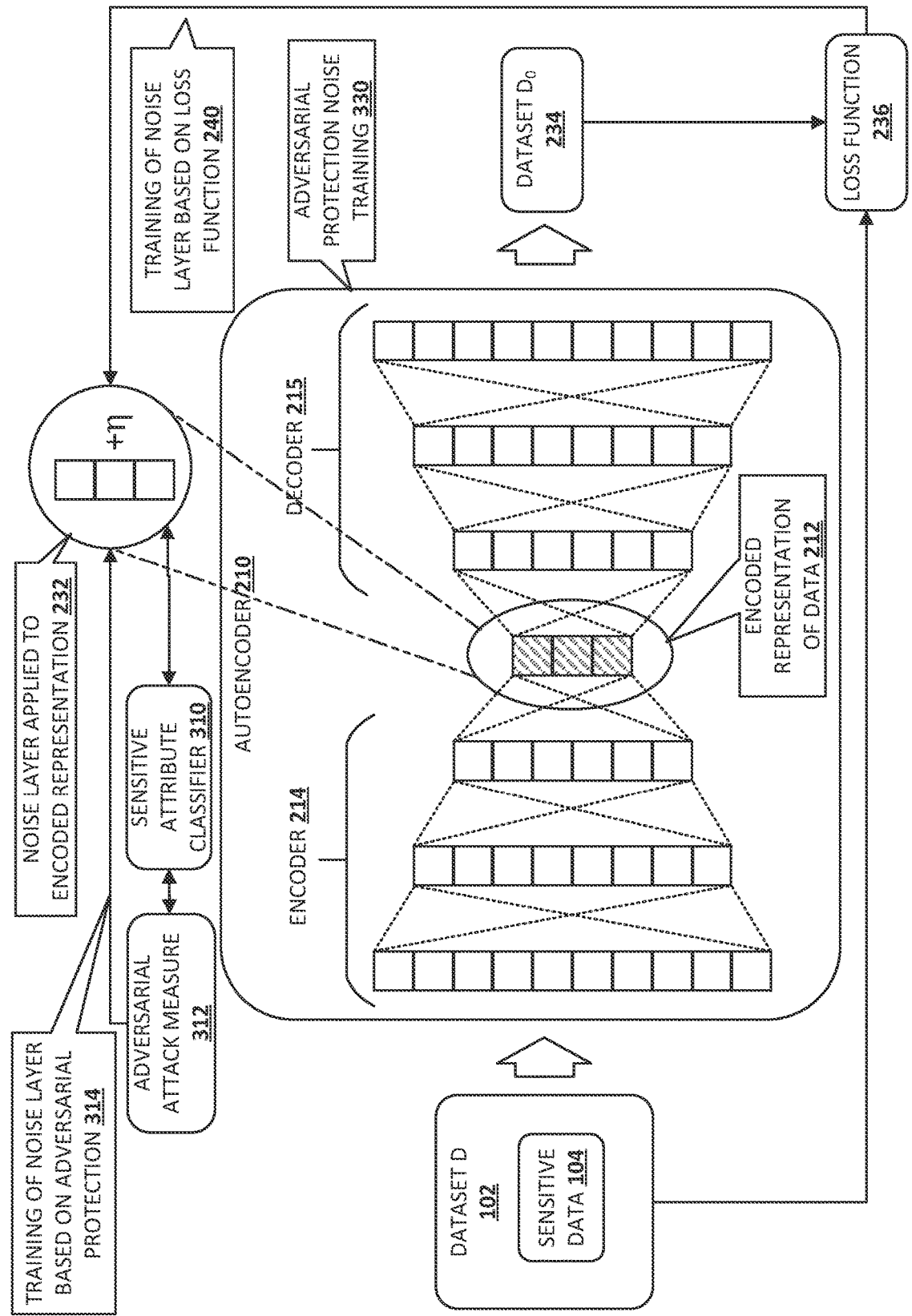
FIG. 3 depicts a system for obfuscation of sensitive attributes while applying noise to an encoded representation of data, in accordance with some embodiments.

FIG. 3 depicts a system for obfuscation of sensitive attributes while applying noise to an encoded representation of data. Adversarial protection noise training 330 may tune the applied noise such that the sensitive data 104 of the dataset D 102 is protected. Sensitive data 104 may be identified in the dataset D 102 an intentionally obfuscated (e.g., protected). The sensitive data 104 may be identified additional constraints to the noise may be applied through noise regularization. For example, an additional adversarial attack measure 312 may be determined, which may be used to measure the prevalence of the sensitive data 104 within the encoded representation of the data 212. A sensitive attribute classifier 310, which may be an inference model trained to infer the sensitive data 104 from the encoded representation of the data 212, may be applied to the encoded representation of the data 212. The sensitive attribute classifier 310 may determine the adversarial attack measure 312, which may be a measure of how likely an adversarial attack is to be successful at recreating the sensitive data 104. An appropriate method and measure of sensitive data 104 content within the encoded representation of the data 212 may be used. The noise layer may be trained based on adversarial protection 314 by any appropriate method, such as by using an adversarial term to the loss function, such as by using Equation 2, below:

$$\min_{\eta} \mathbb{E}_{X \sim D}[\mathcal{R}(X \mid \theta, \eta) + \alpha \mathcal{L}_{noise}(\eta) + \beta \mathcal{L}_{adv}(X \mid \eta, \theta, \Omega)] \quad (2)$$

where $\Omega$ are parameters of an adversarial model, $\mathcal{L}_{adv}$ is the adversarial loss, and $\beta$ is an adjustable noise tuning parameter. The loss function, or another appropriate optimization objective, may be minimized (or maximized if a gain function is used) to determine parameters for the noise which protect the sensitive data 104.

The differentiability of these formulations may be important to the ability to train noise for data obfuscation, where obfuscated data retains training abilities. Because of this characteristic, gradient descent algorithms (e.g., stochastic gradient descent) may be used to find the perturbations ($\sigma$s) which give the maximum perturbation which produce the minimum reconstruction loss. This class of algorithms are conventionally used to train neural networks and discover the weights. However, the neural network (e.g., autoencoder) may be pre-trained and the weight parameters already known. Therefore, in optimization, the gradients may be calculated with respect to the perturbations (σs) that leads to the discovery of the maximum noise.

In another embodiment, the perturbations may be applied to the intermediate representations or the layers of the machine learning model.

Figure 4:
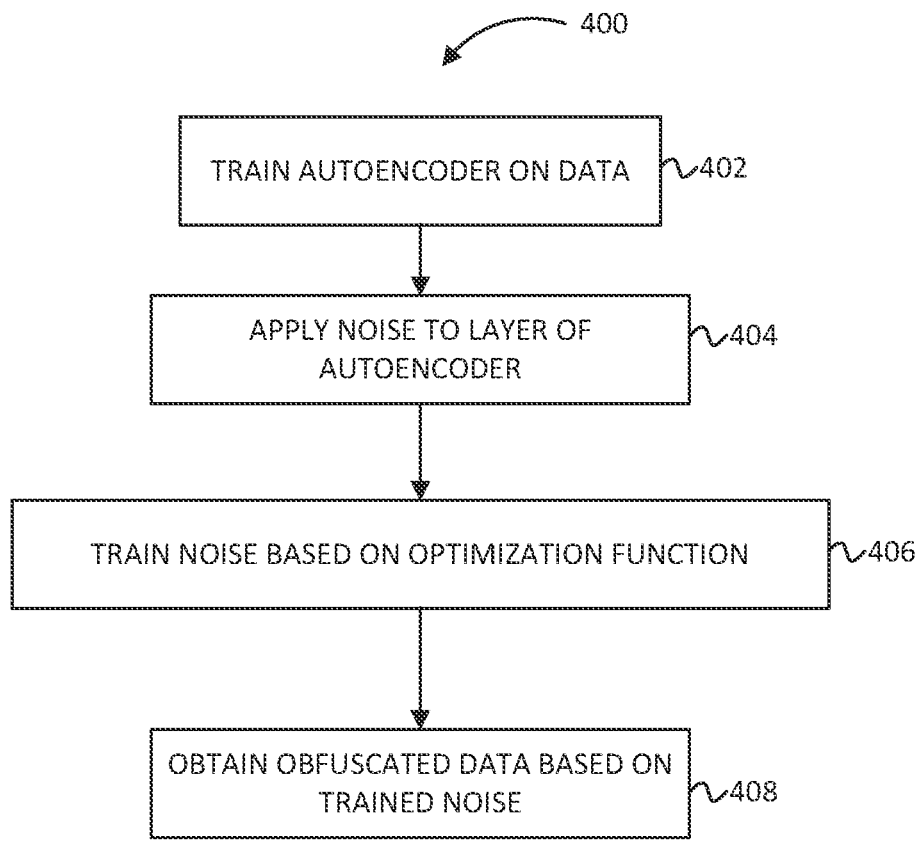
FIG. 4 illustrates an exemplary method for data obfuscation with limited supervision, according to some embodiments.

FIG. 4 illustrates an exemplary method 400 for data obfuscation with limited supervision. Each of these operations is described in detail below. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting. In some embodiments, one or more portions of method 400 may be implemented (e.g., by simulation, modeling, etc.) in one or more processing devices (e.g., one or more processors). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400, for example. For illustrative purposes, optional operations are depicted with dashed lines. However, operations which are shown with unbroken lines may also be optional or may be omitted.

At an operation 402, an autoencoder is trained on data. The autoencoder may instead be another unsupervised machine learning model. The autoencoder may be obtained, instead of trained, such as obtained from storage. The autoencoder may be comprised of an encoder and a decoder. The encoder and the decoder may be symmetrical or asymmetrical, in size, number of layers, etc. The autoencoder may be partially trained, fully trained, untrained, etc. The autoencoder may instead be another unsupervised or self-supervised model in which data is encoded into a latent representation. For example, the autoencoder may be (e.g., additionally or instead) an encoder. The autoencoder may instead or additionally be a neural network or other machine learning algorithm that generates embeddings. The autoencoder may be trained on a set of training data. The data may instead be another type of data, such as inference data, data for re-training, data for additional training, etc. The data may be any appropriate type of data, such as image data, tabular data, etc. Parameters of the trained autoencoder may be stored.

At an operation 404, noise is applied to one or more layer of the autoencoder. The noise may be applied as a stochastic noise layer. Noise may be applied to multiple layers. Noise may be applied to layers of the encoder while not applied to layers of the decoder.

At an operation 406, noise may be trained based on an optimization function. The optimization function may be a loss function. The optimization function may be determined based on output of the autoencoder. The optimization function may be determined based on output of the encoder, the decoder, both the encoder and the decoder, etc. The optimization function may a reconstruction loss, which may be the reconstruction loss used to train the autoencoder. The optimization function may include a noise loss. The relative contribution of the noise loss to the optimization function may be adjusted by application of a tuning parameter. The optimization function may include noise regularization. The optimization function may include an adversarial loss, which may be a measure of the ability of another model to extract sensitive data from the output of the autoencoder or a representation of the data of the autoencoder. The optimization parameters may be any of those optimization parameters previously described, including gradient descent, back propagation, etc. The stochastic layer may be trained until a training criterion is satisfied, which may be a time limit, a number of iterations, a loss function, etc. If the machine learning model is untrained, the stochastic layer may be trained during the training of the machine learning model.

At an operation 408, obfuscated data is obtained based on the trained noise. The obfuscated data may be obtained from the encoder of the autoencoder. The obfuscated data may be obtained from the encoder. The obfuscated data may include quasi-synthetic data, or multiple elements corresponding to different applications of stochastic noise to the dame element of the un-obfuscated dataset. The obfuscated data may be stored. The parameters of the noise used to create the obfuscated data may be stored. The parameters of the autoencoder, with or without the noise, may be stored.

The obfuscated data may be used with federated learning. The obfuscated data may be used within a single server, such as for an ensemble machine learning algorithm, federated learning, etc. The obfuscated data may be transmitted between storage or processing location, such as to or by untrusted operations. The use of obfuscated data may reduce the risk of transmission of data, as the obfuscated data may protect sensitive attributes even if the obfuscated data falls into the wrong hands or shared.

As described above, method 400 (and/or the other methods and systems described herein) is configured to provide a generic framework for obfuscation of data with limited supervision, where limited supervision includes unsupervised obfuscation, self-supervised obfuscation, etc.

Examples of noise distributions and stochastic gradient methods that may be used to find minimum or maximum perturbations are described in U.S. Provisional Pat. App. 63/227,846, titled STOCHASTIC LAYERS, filed 30 Jul. 2021 (describing examples of stochastic layers with properties like those relevant here); U.S. Provisional Pat. App. 63/221,738, titled REMOTELY-MANAGED, NEAR-STORAGE OR NEAR-MEMORY DATA TRANSFORMATIONS, filed 14 Jul. 2021 (describing data transformations that may be used with the present techniques, e.g., on training data); and U.S. Provisional Pat. App. 63/153,284, titled METHODS AND SYSTEMS FOR SPECIALIZING DATASETS FOR TRAINING/VALIDATION OF MACHINE LEARNING, filed 24 Feb. 2021 (describing examples of obfuscation techniques that may be used with the present techniques); each of which is hereby incorporated by reference.

Figure 5:
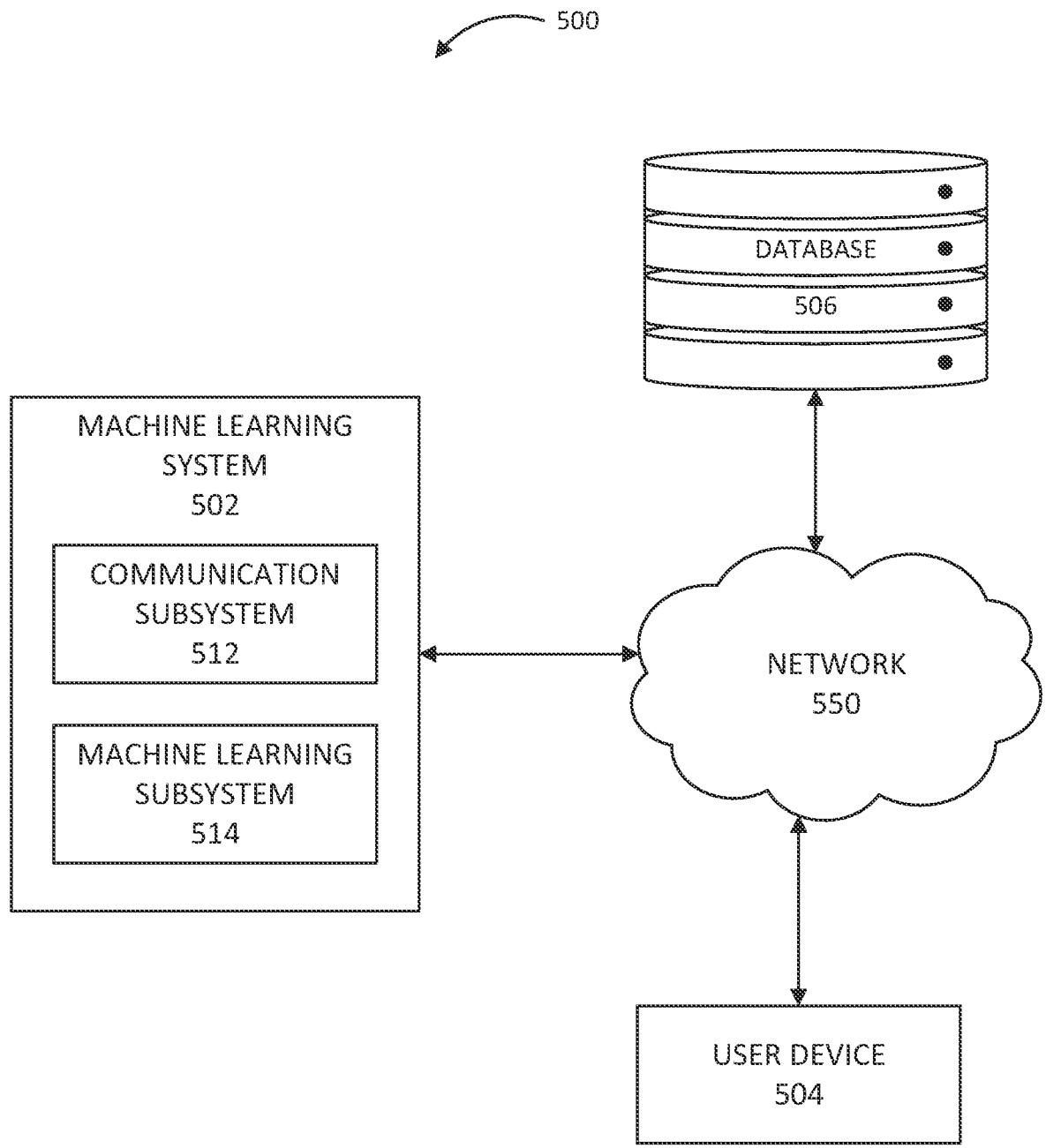
FIG. 5 shows an example computing system that uses a stochastic noise layer in a machine learning model, in accordance with some embodiments.

FIG. 5 shows an example computing system 500 for implementing data obfuscation in machine learning models. The computing system 500 may include a machine learning (ML) system 502, a user device 504, and a database 506. The ML system 502 may include a communication subsystem 512, and a machine learning (ML) subsystem 514. The communication subsystem 512 may retrieve one or more datasets from the database 506 for use in training or performing inference via the ML subsystem 514 (e.g., using one or more machine-learning models described in connection with FIG. 6).

One or more machine learning models used (e.g., for training or inference) by the ML subsystem 514 may include one or more stochastic layers. The machine learning model used by the ML subsystem 514 may be an autoencoder and/or comprise at least one of an encoder and decoder. A stochastic layer may receive input from a previous layer (e.g., in a neural network or other machine learning model) and output data to subsequent layers, for example, in a forward pass of a machine learning model. A stochastic layer may take first data as input and perform one or more operations on the first data to generate second data. For example, the stochastic layer may be a stochastic convolutional layer with a first filter that corresponds to the mean of a normal distribution and a second filter that corresponds to the standard deviation of the normal distribution. The second data may be used as parameters of a distribution (e.g., or may be used to define parameters of a distribution). For example, the second data may include data (e.g., data indicating the mean of the normal distribution) that is generated by convolving the first filter over an input image. In this example, the second data may include data (e.g., data indicating the standard deviation of the normal distribution) that is generated by convolving the second filter over the input image.

One or more values may be sampled from the distribution. The one or more values may be used as input to a subsequent layer (e.g., the next layer following the stochastic layer in a neural network). For example, the mean generated via the first filter and the standard deviation generated via the second filter (e.g., as discussed above) may be used to sample one or more values. The one or more values may be used as input into a subsequent layer. The subsequent layer may be a stochastic layer (e.g., a stochastic convolution layer, stochastic fully connected layer, stochastic activation layer, stochastic pooling layer, stochastic batch normalization layer, stochastic embedding layer, or a variety of other stochastic layers) or a non-stochastic layer (e.g., convolution, fully-connected, activation, pooling, batch normalization, embedding, or a variety of other layers).

A stochastic layer or one or more parameters of a stochastic layer may be trained via gradient descent (e.g., stochastic gradient descent) and backpropagation, or a variety of other training methods. One or more parameters may be trained, for example, because the one or more parameters are differentiable with respect to one or more other parameters of the machine learning model. For example, the mean of the normal distribution may be differentiable with respect to the first filter (e.g., or vice versa). As an additional example, the standard deviation may be differentiable with respect to the second filter (e.g., or vice versa).

In some embodiments, one or more parameters of a stochastic layer may be represented by a probability distribution. For example, a filter in a stochastic convolution layer may be represented by a probability distribution. The ML subsystem 514 may generate a parameter (e.g., a filter or any other parameter) of a stochastic layer by sampling from a corresponding probability distribution.

In some embodiments, the system determines a maximum noise variance causing a minimum reconstruction loss on the neural network. The maximum noise variance is a differentiable output. To obtain the maximum noise variance value, the system calculates gradients using gradient descent algorithms (e.g., stochastic gradient descent) on a pre-trained neural network. As the neural network is pre-trained with known weight parameters, the optimization calculates the gradients with respect to the minimum noise variance (e.g., perturbations).

In some embodiments, the maximum noise variance may be determined as described herein and applied to one or more intermediate layers of a machine learning model.

In some embodiments, the maximum noise variance may be constrained by a maximum reconstruction loss value. The maximum reconstruction loss value may depend on the type of model as a subsequent machine learning model which is to be trained on the obfuscated data. The maximum reconstruction loss value may be variable.

The user device 504 may be a variety of different types of computing devices, including, but not limited to (which is not to suggest that other lists are limiting), a laptop computer, a tablet computer, a hand-held computer, smartphone, other computer equipment (e.g., a server or virtual server), including "smart," wireless, wearable, Internet of Things device, or mobile devices. The user device 504 may be any device used by a healthcare professional (e.g., a mobile phone, a desktop computer used by healthcare professionals at a medical facility, etc.). The user device 504 may send commands to the ML system 502 (e.g., to train a machine-learning model, perform inference, etc.). Although only one user device 504 is shown, the system 500 may include any number of client devices.

The ML system 502 may include one or more computing devices described above and may include any type of mobile terminal, fixed terminal, or other device. For example, the ML system 502 may be implemented as a cloud computing system and may feature one or more component devices. Users may, for example, utilize one or more other devices to interact with devices, one or more servers, or other components of system 500. In some embodiments, operations described herein as being performed by particular components of the system 500, may be performed by other components of the system 500 (which is not to suggest that other features are not also amenable to variation). As an example, while one or more operations are described herein as being performed by components of the ML system 502, those operations may be performed by components of the user device 504 or database 506. In some embodiments, the various computers and systems described herein may include one or more computing devices that are programmed to perform the described functions. In some embodiments, multiple users may interact with system 500. For example, a first user and a second user may interact with the ML system 502 using two different user devices.

One or more components of the ML system 502, user device 504, and database 506, may receive content and other data via input/output (hereinafter "I/O") paths. The one or more components of the ML system 502, the user device 504, and/or the database 506 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the ML system 502, the user device 504, and the database 506 may have neither user input interface nor displays and may instead receive and display content using another device (e.g., a dedicated display device such as a computer screen and/or a dedicated input device such as a remote control, mouse, voice input, etc.). Additionally, the devices in system 500 may run an application (or another suitable program). The application may cause the processors and other control circuitry to perform operations related to weighting training data (e.g., to increase the efficiency of training and performance of one or more machine-learning models described herein).

One or more components or devices in the system 500 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically, magnetically, or optically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 5 also includes a network 550. The network 550 may be the Internet, a mobile phone network, a mobile voice or data network (e.g., a 5G or LTE network), a cable network, a public switched telephone network, a combination of these networks, or other types of communications networks or combinations of communications networks. The devices in FIG. 5 (e.g., ML system 502, the user device 504, and/or the database 506) may communicate (e.g., with each other or other computing systems not shown in FIG. 5) via the network 550 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 5 may include additional communication paths linking hardware, software, and/or firmware components operating together. For example, the ML system 502, any component of the ML system 502 (e.g., the communication subsystem 512 or the ML subsystem 514), the user device 504, and/or the database 506 may be implemented by one or more computing platforms.

Figure 6:
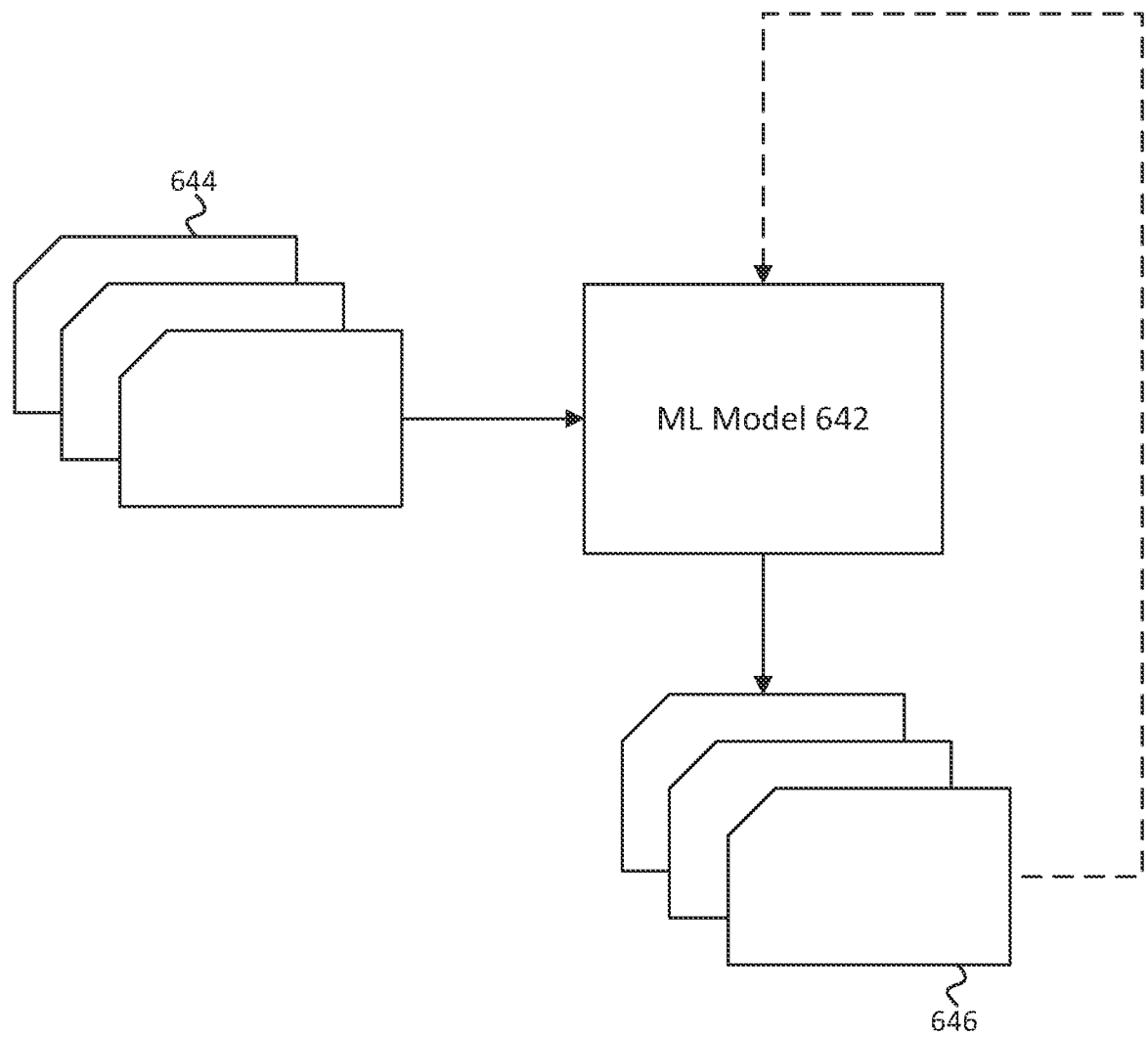
FIG. 6 shows an example machine-learning model that may use one or more vulnerability stochastic layer, in accordance with some embodiments.

One or more machine-learning models that are discussed above (e.g., in connection with FIG. 5 or the technical documentation) may be implemented, for example, as shown in FIG. 6. With respect to FIG. 6, machine-learning model 642 may take inputs 644 and provide outputs 646.

In some use cases, outputs 646 may be fed back to machine-learning model 642 as input to train machine-learning model 642 (e.g., alone or in conjunction with user indications of the accuracy of outputs 646, labels associated with the inputs, or with other reference feedback and/or performance metric information). In another use case, machine-learning model 642 may update its configurations (e.g., weights, biases, or other parameters) based on its assessment of its prediction (e.g., outputs 646) and reference feedback information (e.g., user indication of accuracy, reference labels, or other information). In another example use case, where machine-learning model 642 is a neural network and connection weights may be adjusted to reconcile differences between the neural network's output and the reference feedback. In some use cases, one or more perceptrons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine-learning model 642 may be trained to generate results (e.g., response time predictions, sentiment identifiers, urgency levels, etc.) with better recall, accuracy, or precision.

In some embodiments, the machine-learning model 642 may include an artificial neural network ("neural network" herein for short). In such embodiments, machine-learning model 642 may include an input layer (e.g., a stochastic layer as described in connection with FIG. 5) and one or more hidden layers (e.g., a stochastic layer as described in connection with FIG. 5). Each neural unit of the machine-learning model may be connected with one or more other neural units of the machine-learning model 642. Such connections may be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine-learning model 642 may be self-learning (e.g., trained), rather than explicitly programmed, and may perform significantly better in certain areas of problem solving, as compared to computer programs that do not use machine learning. During training, an output layer (e.g., a stochastic layer as described in connection with FIG. 5) of the machine-learning model 642 may correspond to a classification, and an input (e.g., any of the data or features described in the machine learning specification above) known to correspond to that classification may be input into an input layer of machine-learning model during training. During testing, an input without a known classification may be input into the input layer, and a determined classification may be output. The machine-learning model 642 trained by the ML subsystem 514 may include one or more embedding layers (e.g., a stochastic layer as described in connection with FIG. 5) at which information or data (e.g., any data or information discussed above in connection with the machine learning specification) is converted into one or more vector representations. The one or more vector representations of the message may be pooled at one or more subsequent layers (e.g., a stochastic layer as described in connection with FIG. 5) to convert the one or more vector representations into a single vector representation.

The machine-learning model 642 may be structured as a factorization machine model. The machine-learning model 642 may be a non-linear model and/or (use of which should not be read to suggest that other uses of "or" mean "xor") supervised learning model that may perform classification and/or regression. For example, the machine-learning model 642 may be a general-purpose supervised learning algorithm that the system uses for both classification and regression tasks. Alternatively, the machine-learning model 642 may include a Bayesian model configured to perform variational inference given any of the inputs 644. The machine-learning model 642 may be implemented as a decision tree, as an ensemble model (e.g., using random forest, bagging, adaptive booster, gradient boost, XGBoost, etc.), or any other machine-learning model.

The machine-learning model 642 may perform one or more downstream tasks, which may include the generation of outputs 646. The downstream task may be an unsupervised algorithm, such as k-means clustering, spectral clustering, principal component analysis (PCA), encoding, including by an auto-encoding algorithm, etc. The machine-learning model 642 may generate embeddings as outputs 646. The machine-learning model 642 may be an unsupervised model.

The machine-learning model 642 may be a reinforcement learning model. The machine-learning model 642 may take as input any of the features described above (e.g., in connection with the machine learning specification) and may output a recommended action to perform. The machine-learning model may implement a reinforcement learning policy that includes a set of actions, a set of rewards, and/or a state.

The reinforcement learning policy may include a reward set (e.g., value set) that indicates the rewards that the machine-learning model obtains (e.g., as the result of the sequence of multiple actions). The reinforcement learning policy may include a state that indicates the environment or state that the machine-learning model is operating in. The machine-learning model may output a selection of an action based on the current state and/or previous states. The state may be updated at a predetermined frequency (e.g., every second, every 2 hours, or a variety of other frequencies). The machine-learning model may output an action in response to each update of the state. For example, if the state is updated at the beginning of each day, the machine-learning model 642 may output an action to take based on the action set and/or one or more weights that have been trained/adjusted in the machine-learning model 642. The state may include any of the features described in connection with the machine learning specification above. The machine-learning model 642 may include a Q-learning network (e.g., a deep Q-learning network) that implements the reinforcement learning policy described above.

In some embodiments, the machine-learning models may include a Bayesian network, such as a dynamic Bayesian network trained with Baum-Welch or the Viterbi algorithm. Other models may also be used to account for the acquisition of information over time to predict future events, e.g., various recurrent neural networks, like long-short-term memory models trained on gradient descent after loop unrolling, reinforcement learning models, and time-series transformer architectures with multi-headed attention. In some embodiments, some or all of the weights or coefficients of models described herein may be calculated by executing a machine learning algorithm on a training set of historical data. Some embodiments may execute a gradient descent optimization to determine model parameter values. Some embodiments may construct the model by, for example, assigning randomly selected weights; calculating an error amount with which the model describes the historical data and a rate of change in that error as a function of the weights in the model in the vicinity of the current weight (e.g., a derivative, or local slope); and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration. The resulting, trained model, e.g., a vector of weights or thresholds, may be stored in memory and later retrieved for application to new calculations on newly calculated aggregate estimates.

In some cases, the amount of training data may be relatively sparse. This may make certain models less suitable than others. In such cases, some embodiments may use a triplet loss network or Siamese networks to compute similarity between out-of-sample records and example records in a training set, e.g., determining based on cosine distance, Manhattan distance, or Euclidian distance of corresponding vectors in an encoding space (e.g., with more than 5 dimensions, such as more than 50).

Run time may process inputs outside of a training set and may be different from training time, except for in use cases like active learning. Random selection includes pseudorandom selections. In some cases, the neural network may be relatively large, and the portion that is non-deterministic may be a relatively small portion. The neural network may have more than 10, 50, or 500 layers, and the number of stochastic layers may be less than 10, 5, or 3, in some cases. In some cases, the number of parameters of the neural network may be greater than 10,000; 100,000; 1,000,000; 10,000,000; 10,000,000,000, or even more; while the number of stochastic parameters may be less than 10%, 5%, 1%, or 0.1% of that. This is expected to address problems that arise when traditional probabilistic neural networks attempt to scale, which with many approaches, produces undesirably excessive scaling in memory or run time complexity. Other benefits expected of some embodiments include enhanced interpretability of trained neural networks based on statistical parameters of trained stochastic layers, the values of which may provide insight (e.g., through visualization, like by color coding layers or components thereof according to values of statistical parameters after training) into the contribution of various features in outputs of the neural network, enhanced privacy from injecting noise with granularity into select features or layers of the neural network making downstream layers our outputs less likely to leak information, and highlighting layers or portions thereof for pruning to compress neural networks without excessively impairing performance by removing those components that the statistical parameters indicate are not contributing sufficiently to performance. In some cases, the stochastic layers may be partially or fully constituted of differential parameters adjusted during training, which is expected to afford substantial benefits in terms of computational complexity during training relative to models with non-differentiable parameters. That said, embodiments are not limited to systems affording all of these benefits, which is not to suggest that any other description is limiting.

Figure 7:
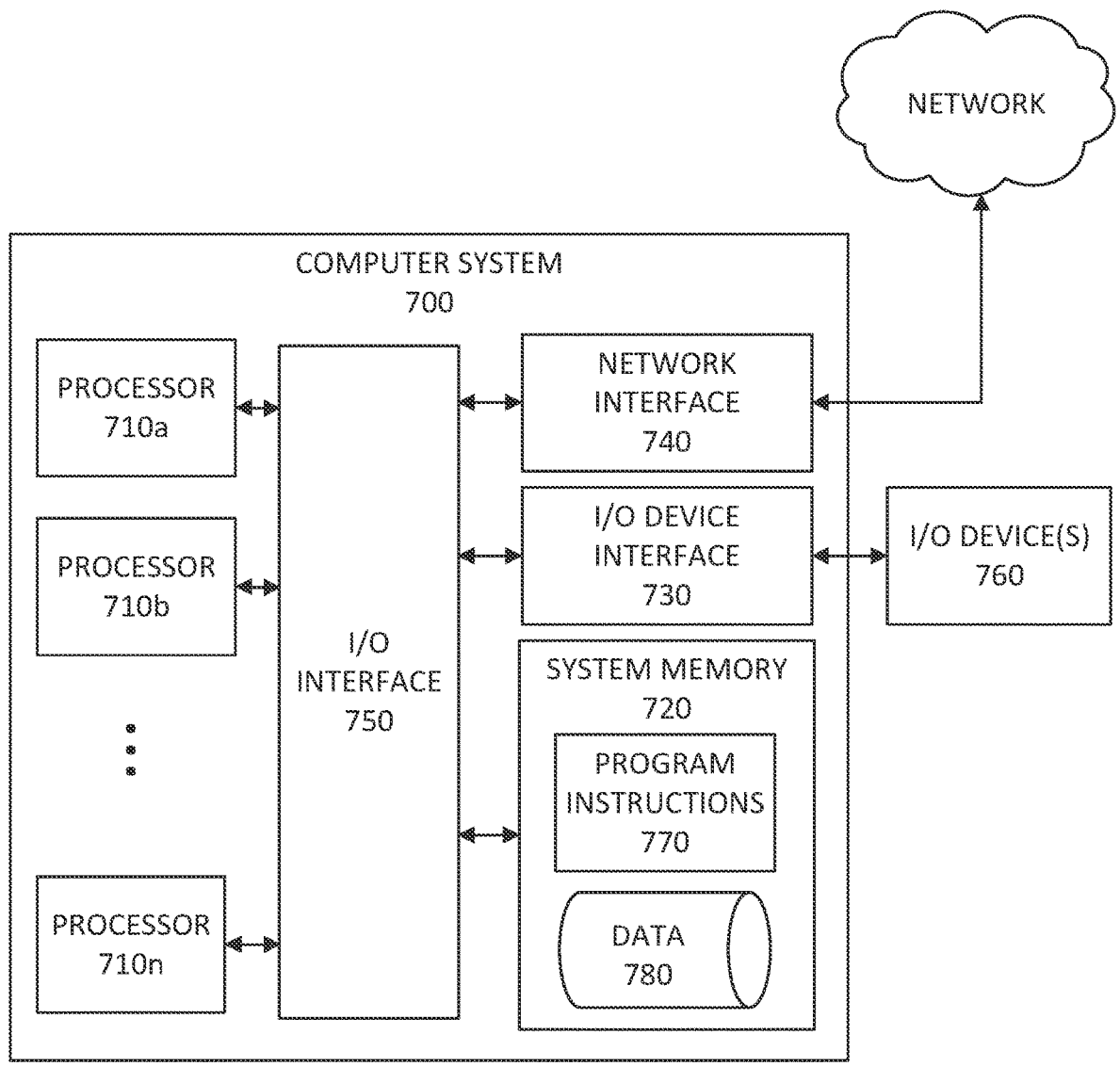
FIG. 7 shows an example computing system that may be used in accordance with some embodiments.

FIG. 7 is a diagram that illustrates an exemplary computing system 700 in accordance with embodiments of the present technique. Various portions of systems and methods described herein, may include or be executed on one or more computer systems similar to computing system 700. Further, processes and modules described herein may be executed by one or more processing systems similar to that of computing system 700.

Computing system 700 may include one or more processors (e.g., processors 710a-710n) coupled to system memory 720, an input/output (I/O) device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a units-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 700 may include a plurality of computing devices (e.g., distributed computer systems) to implement various processing functions.

I/O device interface 730 may provide an interface for connection of one or more I/O devices 760 to computing system 700. I/O devices may include devices that receive input (e.g., from a user) or output information (e.g., to a user). I/O devices 760 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computing system 700 through a wired or wireless connection. I/O devices 760 may be connected to computing system 700 from a remote location. I/O devices 760 located on remote computer system, for example, may be connected to computing system 700 via a network and network interface 740.

Network interface 740 may include a network adapter that provides for connection of computing system 700 to a network. Network interface 740 may facilitate data exchange between computing system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 770 or data 780. Program instructions 770 may be executable by a processor (e.g., one or more of processors 710a-710n) to implement one or more embodiments of the present techniques. Program instructions 770 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices).

I/O interface 750 may be configured to coordinate I/O traffic between processors 710a-710n, system memory 720, network interface 740, I/O devices 760, and/or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 700 or multiple computer systems 700 configured to host different portions or instances of embodiments. Multiple computer systems 700 may provide for parallel or sequential processing/execution of one or more portions of the techniques described herein.

Those skilled in the art will appreciate that computing system 700 is merely illustrative and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 700 may be transmitted to computing system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

As data storage and analysis costs decrease (such as due to storage unit cost decrease, processing cost decrease, increased use of cloud computing, transmission speed increases, etc.), data collection by various entities (e.g., service providers, public safety entities, commercial enterprises, etc.) has increased, leading to generation of large troves of information, which may be referred to as "big data". The data may exist in many forms: visual (e.g., image data), textual (e.g., language), tabular (e.g., columnar, spreadsheet, etc.), including in multiple forms within a single data collection. Rapid scaling of AI, including deep neural networks, has enabled entities to extract high value from data stores, such as by predictive customer churn, through generative modeling, etc. However, much of the data collected may contain highly sensitive information, such as facial images, public health information (PHI), etc. An entity may have obligations (legal, contractual, moral, etc.) to protect such sensitive information, including obligations to keep such data private or otherwise safe from access or dissemination. A transform that would protect the information in the data store, while allowing value to be extracted from the data collection would allow an entity to monetize a data store while maintaining data privacy. More value may be extracted from more granular data, which may be less obfuscated—that is, there may be a tradeoff between value extraction and data privacy which may be adjusted. Such as transform may be applied as data is extracted from the data collection (e.g., leaving the data collection unobfuscated) or applied to the data of the data collection (e.g., to produce an obfuscated data collection).

A system and method for obfuscation of data is described herein. In some embodiments, a Foundation Model (also referred to as a foundational model) is used. In some embodiments, self-supervised learning is used. A formulation is developed which may provide a method for obfuscating data (including sensitive data), which may be a method for generating obfuscated training data in foundation models. In some embodiments, given a foundation model that generates representations of the source data (e.g., the input data, the data of the data collection, or another data store), a transformation, which may be stochastic, may be learned (e.g., trained) which is a significant transform (e.g., obfuscating) in the input space (e.g., on the data of the data collection) but which is less significant in the output space (e.g., in the output space of the foundation model). This transform may therefore generate data (or other outputs) which are valuable for data inference, modeling, training, etc. purposes while maintaining data privacy. This framework may be applied to a variety of data types, including but not limited to vision, text, and tabular datasets.

Some embodiments, such as the one presently discussed, may provide value to both the owners of the data (e.g., such that data owners continue to provide data to the data collection and transform) and to consumers of the data (e.g., entities that may not own or otherwise be able to access private information within the data but may operate upon the data). Consumers of the data may include, for example, data scientists who may train machine learning (ML) models on the data. Enabling consumers of the data greater access to the data may increase the impact and value of any models trained thereon. Data owners may be incentivized to continue to contribute to a data store, such as by payment of access fees or royalties, as long as they are issued guarantees on the privacy of their data (e.g., from release from the data store).

High value may be extracted from large collections of data which do not have any privacy conditions. Value can be extracted due to creation of inference models, collections of access fees, selling of the data to other entities, etc. In some embodiments, this value may continue to be extracted from a data collection while maintaining privacy (including privacy of all or only some data). Some embodiments may operate to provide these privacy guarantees. Some embodiments may be to enable users (such as data scientists) to train effective downstream ML models on this privacy-protected data, on a wide range of tasks. For example, in a natural language (text) use case a data owner, Alice, may petabytes of customer reviews for her streaming services. These customer reviews may be stored as unstructured text, e.g., very little may be provided other than the words of the review itself. The data owner, Alice, may ask a data scientist, Bob, to analyze and extract value from this dataset. Bob may decide to categorize the reviews (e.g., in unstructured text) based off of intent—for example (1) is the user criticizing the movie? (2) is the user praising their favorite show? (3) is the user complaining about the streaming service itself? To answer these questions, Bob may define a set of predictive features to be extracted from the data. In this example, Bob may have some business knowledge that may help categorize the text which may allow Bob to produce a set of rules such as:

Does the review contain the name of the movie? Containing the name of the movie may correspond to relevance of the review to the movie itself.

How long is the review? The length of the review may be indicative of level of thoughtfulness of the response, such as where longer review may indicate careful praise of the content.

Does the review contain words associated with negative/positive emotions?

Does the review highlight terms relate to the performance of the streaming service?

Bob may now apply these rules to the data, generate features, and categorize the existing data. Bob may even train an ML model using these collected features as training data to automatically bin new incoming reviews. However, stakeholders may want Bob to do something completely different, e.g., providing recommendations to users based on these reviews. In this case, the previous set of rules may no longer apply. Bob may not even know the task that other entities want to train a model to perform, so Bob may not be able to rely on being able to manually build features every time a new downstream task is to be applied to Alice's data. Bob may search for a way to automatically extract features from the dataset which may be applied to or used in a variety of downstream tasks.

The desire for additional features, which may not even be obviously relevant to the model at a given point but which may prove useful for as yet undiscovered tasks, may lead to use of deep learning. Given a large dataset, deep neural network architectures may extract correlations and highly dense information. However, deep learning may require a set of informative labels to automatically produce a set of useful features, where informative and useful may be defined relative to a given task. The use of deep learning may temporarily alleviate Bob's issue; however, this may also require the dataset to be labeled beforehand, something that is unreliable at scale due to the cost of labeling large data stores. Foundation models may alleviate this issue. A foundation model may be any model that is trained on broad data that can be adapted to a wide range of downstream tasks. This term may include techniques such as pre-training (on unstructured data) and fine-tuning (on downstream tasks). Although these terms describe these models at a technical level, the term foundation may capture the paradigm shift in deployment of foundation models. Foundation models may now more effectively capture useful statistics in the data, and may work on a much larger group of tasks.

Figure 8:
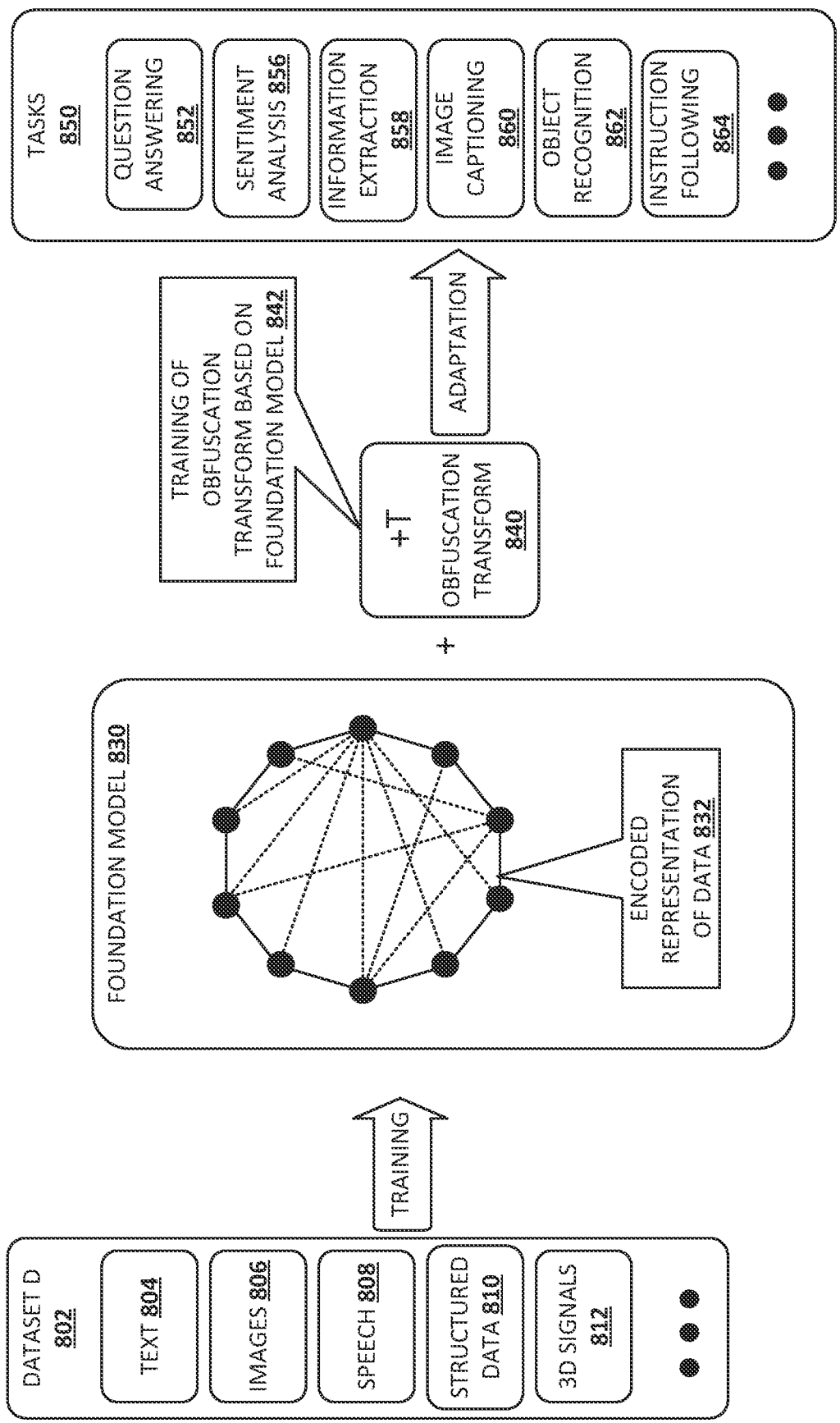
FIG. 8 depicts a system for self-supervised obfuscation on a foundation model, in accordance with some embodiments.

FIG. 8 depicts a system for self-supervised obfuscation based on a foundation model 830. The foundation model 830 operates based on a dataset D 802, which may also be referred to as an input. The dataset D 802 may contain one or more different types of data, including text 804, images, 806, speech 808, structured data 810, 3D signals 812, etc. The dataset D 802 may be used to train the foundation model 830. The foundation model 830 may be any appropriate type of foundation model. The foundation model 830 may generate an encoded representation of input data 832. The encoded representation of input data 832 may be a latent representation. The foundation model 830 may be used to perform one or more tasks 850, which may include question answering 852, sentiment analysis 856, information extraction 858, image captioning 860, object recognition 862, instruction following 864, etc. The foundation model 830 may require adaptation to perform one or more of the tasks 850. An obfuscation transform 840 may be applied to the foundation model 830 in order to provide privacy for the dataset D 802 on which the foundation model 830 is based (or otherwise operates upon). The obfuscation transform 840 may be trained based on the foundation model 842, such as through self-supervised training.

The efficacy of foundation models may come, at least partly, from architectural improvements in deep learning models such as the transformer. A transformer may allow for efficient storage and queries on learned features, which may allow for massive parallelization that which may be required to unlock additional value in large datasets. The transformer may be a building block for many foundation models: such as BERT and GPT-3 for language, and even ViT for vision.

The essence of the success of foundation models on downstream task specialization may be due to the quality of their output representations. Such architectures may be adjusted to perform a variety of tasks. For example, for textual language, the outputs of these models may be used as dense inputs to ML models which may end up with high performance, whether it be for classification, question-answering, or generation.

To continue the previous example, knowing this, Bob may now use a foundation model pipeline to provide near immediate business value to stakeholders, using the data Alice has provided by:

1. Preprocess data into proper inputs for BERT
2. Collect a small subset of necessary labels needed for task at hand (content understanding, recommendations)
3. Run the data through BERT, obtain its outputs, and train downstream model to solve the task.

The procedure outlined above may be enabled by the representational power of a foundation model, such as BERT. Instead of working on the raw words of the text, these words may first be processed by the large model (e.g., BERT) which outputs dense representations that have captured predictive information in the text. In some embodiments, the dense representations may be used to protect information in the original data (e.g., preserve privacy).

Privacy may be allowed (e.g., data may be obfuscated), because not all data may be needed by any given ML model. For example, ML models have been shown to often focus on at least partially spurious features which are unrecognizable (e.g., already obfuscated) to humans. To address this, in some embodiments, formulations have been created to distill necessary information into a data obfuscation process. Previous privacy methods, however, may rely on knowing what the data will be used for—e.g., classification labels, regression targets, or rankings may be required to fine-tune the obfuscation process.

However, some embodiments, such as the one presently discussed, may enable generalized data obfuscation while only operating on unstructured data, much like foundation models. And much like these models, some embodiments may rely on self-supervised learning to generate (even automatically generate) training signals to learn obfuscations.

Data augmentations may contribute to the success of training deep neural networks. They may be used not only to generate more training samples, but have become a key factor that enables self-supervised learning. Specifically, self-supervised learning may rely on the hypothesis that the output representation of an image X, from a model $f_\theta$ should remain the same after a data augmentation T. Equation (3) provides an example optimization:

$$\min_{\theta} \|f_\theta(X) - f_\theta(T(X))\|_2^2 \qquad (3)$$

where T would represent the data obfuscation process. Given some model that may condense the data into an output representation, the output of the model should not change after applying T, which may lead to the optimization of Equation 4.

$$\min_{T} \|f_\theta(X) - f_\theta(T(X))\|_2^2 \qquad (4)$$

If $f_\theta$ is a trained foundation model, learning T in order maintain the output representations using Equation (4) after transformation may still allow a variety of downstream tasks to be trained on transformed data.

In some embodiments, the obfuscation process T may be learned. As long as T may be parameterized, an optimal set of parameters may be learned from a dataset, even given a set of privacy constraints. In some embodiments, by combining the optimization for T and utilizing the power of foundation models, a generic method for learning obfuscation processes that maintain strong downstream task performance is provided.

Because the space of all possible transformations may be infinitely large, T may be restricted to stochastic transforms parameterized by $\phi$. In other words, given a training data input X(i), obfuscating X(i) will be substantially the same as sampling from a distribution parameterized by $\phi$. If T is chosen to be the family of Gaussian distributions parameterized by $\phi = \{\mu, \Sigma\}$, then:

$$Z^{(i)} := T_\phi(X^{(i)}) = X^{(i)} + \xi, \xi \sim N(\mu, \Sigma) \Leftrightarrow Z^{(i)} \sim N(X^{(i)} + \mu, \Sigma) \quad (5)$$

To guarantee the privacy of the transformed data, mutual information between two random variables $I(\cdot, \cdot)$ may be used. Specifically, the data may be considered to be more obfuscated, if there is less shared information between X and $T_\phi(X)$, such as by minimization of the mutual information as given in Equation 6:

$$\min_\Phi I(X, T_\phi(X)) \quad (6)$$

In the case for Gaussian transformations, this may amount to maximizing the entropy of $T_\phi$.

This mathematical definition, however, may not cover custom privacy requirements of the original owner of the data. For example, if X is a data record with $d \in \mathbb{N}$ features, a data owner may not want to reveal information about feature j, denoted as $X_j$. To address this, $\Omega \subseteq [d]$ may be set as the set of features in X that a data owner wants to conceal with T(X), up to certain bounds $0 \leq \delta_j \leq 1$ on each feature. In other words, an oracle function $C$ that outputs a level of concealment (from 0 to 1) of private information between inputs X and T(X), may be equivalent to augmenting Equation 6 to the following:

$$\min_\Phi I(X, T_\phi(X)) \text{ s.t. } C(X_j, T_\phi(X)) \geq 1 - \delta_j, \forall j \in \Omega \quad (7)$$

In some embodiments, the ideas described above may be put together to generate obfuscation. In some embodiments, a value that may be extracted from T(X) may be maximized, while T also provides privacy for the original data X. The privacy requirement may be achieved through optimizing (7); however, an optimization may result in a transformation that removes predictive information—including completely removing predictive information. In order to retain predictive information, foundation models and their representations may be used.

Given a foundation model $f_\theta$ for the dataset $\mathcal{D} = \{X^{(i)}\}$, the optimization of Equation 7 may be augmented with Equation 4 such that:

$$\min_\phi \frac{1}{N} \sum_{i=1}^{N} \|f_\theta(X^{(i)}) - f_\theta(T(X^{(i)}))\|_2^2 + I(X^{(i)}, T_\phi(X^{(i)})) \quad (8)$$

-continued
$$\text{s.t. } C(X_j^{(i)}, T_\phi(X^{(i)})) \geq 1 - \delta_j, \forall j \in \Omega$$

The additional self-supervised term based on $f_\theta$ may be used to force $T_\phi$ to learn a transformation that remains faithful to the foundation model, e.g., to ensure that the predictive information within X is not completely destroyed. Because $f_\theta$ has encoded the predictive information of the foundation model within X, $T_\phi$ may be constrained to only perturb the output representations by a small amount while significantly transforming X. This may provide a perturbation which greatly obfuscates collected data, while ensuring that the collected data or foundation model is valuable for further training.

A broad procedure for learning an obfuscation generation may then be:
1. Determine the data type for desired dataset $\mathcal{D}$.
2. Obtain a foundation model, such as an off the shelf foundation model, that encodes the data type into an output representation.
3. Optimize (8) based on the family of desired obfuscation processes $T_\phi$.

In some embodiments, this formulation to a variety of data types—examples are provided herein for vision, language, and tabular data. Note, however, that this formulation is not specific to only these three, and Equation 8 is applicable to any data type that has a foundation model.

In order to train $T_\phi$ to work across the visual modality, a vision-based foundation model may be used. For example, a Contrastive Language Image Pretraining (CLIP), which is a multi-modal way to learn zero-shot vision classifiers, may be used. CLIP operates through two encoder networks: an image encoder, and a text encoder. During training, additional language labels are provided to describe the class of an input X. Both encoders may then be trained such that the cosine similarity between the encoded image and its encoded label description is maximized, while any incorrect label descriptions have minimal cosine similarity.

After training, the CLIP may operate as a high-quality multi-modal foundation model. Therefore, in some embodiments, for vision tasks, a trained CLIP image encoder may be used as $f_\theta$. The transform $T_\phi$ may be applied to the input images to the image encoder, and Equation 8 may be followed using the particular dataset and its required constraints.

Figure 9A:
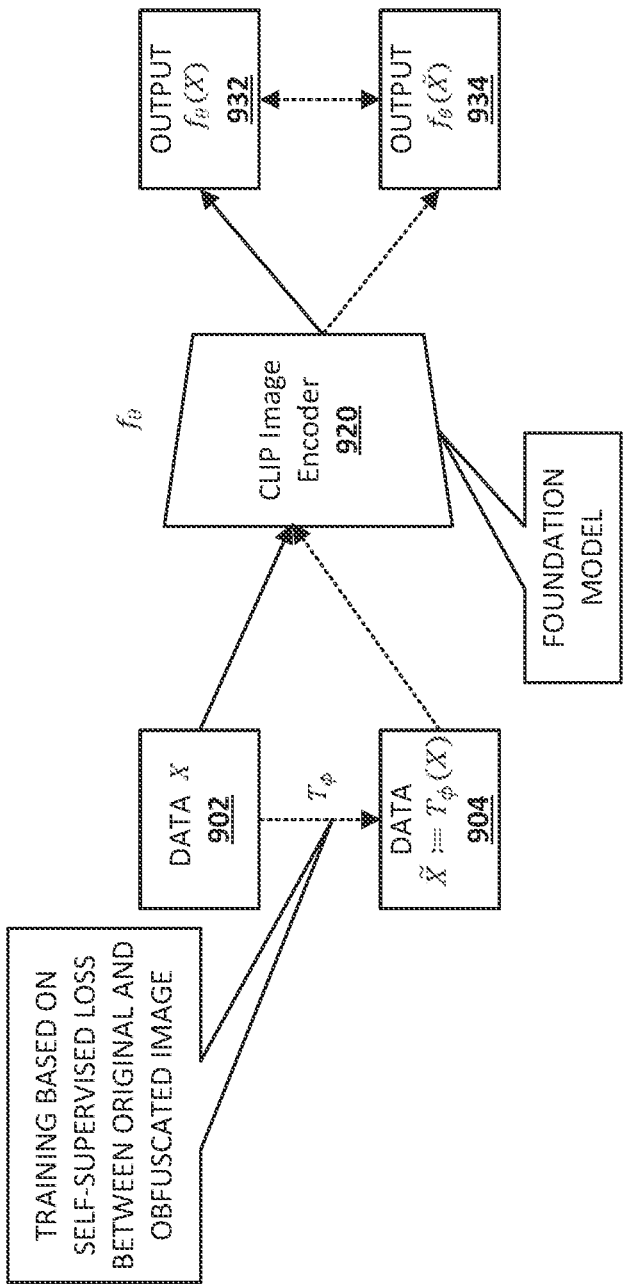
FIG. 9A depicts a system for self-supervised obfuscation applied to an image-based model, in accordance with some embodiments.

FIG. 9A depicts a system for self-supervised obfuscation applied to an image-based model, which may be a CLIP image encoder 920. The image-based model may be any appropriate image-based foundation model, such as the CLIP image encoder 920, which may be the foundation model $f_\theta$. The image-based foundation model may operate on data X 902. The CLIP image encoder 920 may produce an output $f_\theta(X)$ 932 based on the data X 902. A set of obfuscated data $\tilde{X}$ 904 may be generated based on a learned transformation $T_\phi$, such that $\tilde{X} := T_\phi(X)$. The set of obfuscated data $\tilde{X}$ 904 may protect privacy of information within the data X 902, such as by application of stochastic noise. Dashed lines in FIG. 9A may represent a flow for obfuscated images. The CLIP image encoder 920 may produce an output $f_\theta(\tilde{X})$ 934 based on the obfuscated data $\tilde{X}$ 904. The final representations may be trained based on a self-supervised loss determined based on the original and obfuscated images.

For language-based models, the application of some embodiments may be at least slightly more complicated. In some embodiments, a representative foundation model may be used. In an example case, a text encoder BERT may be used. In some language-based models, instead of the transformation being applied directly on the input X (which may be represented as sequences of discrete tokens), the obfuscation may be applied in the word embedding layer, e.g., in the first step of BERT, where tokens are converted to embeddings for the model to use in its transformer modules. The word embedding layer may be used as $f_\theta$ for which Equation 8 is applied.

Figure 9B:
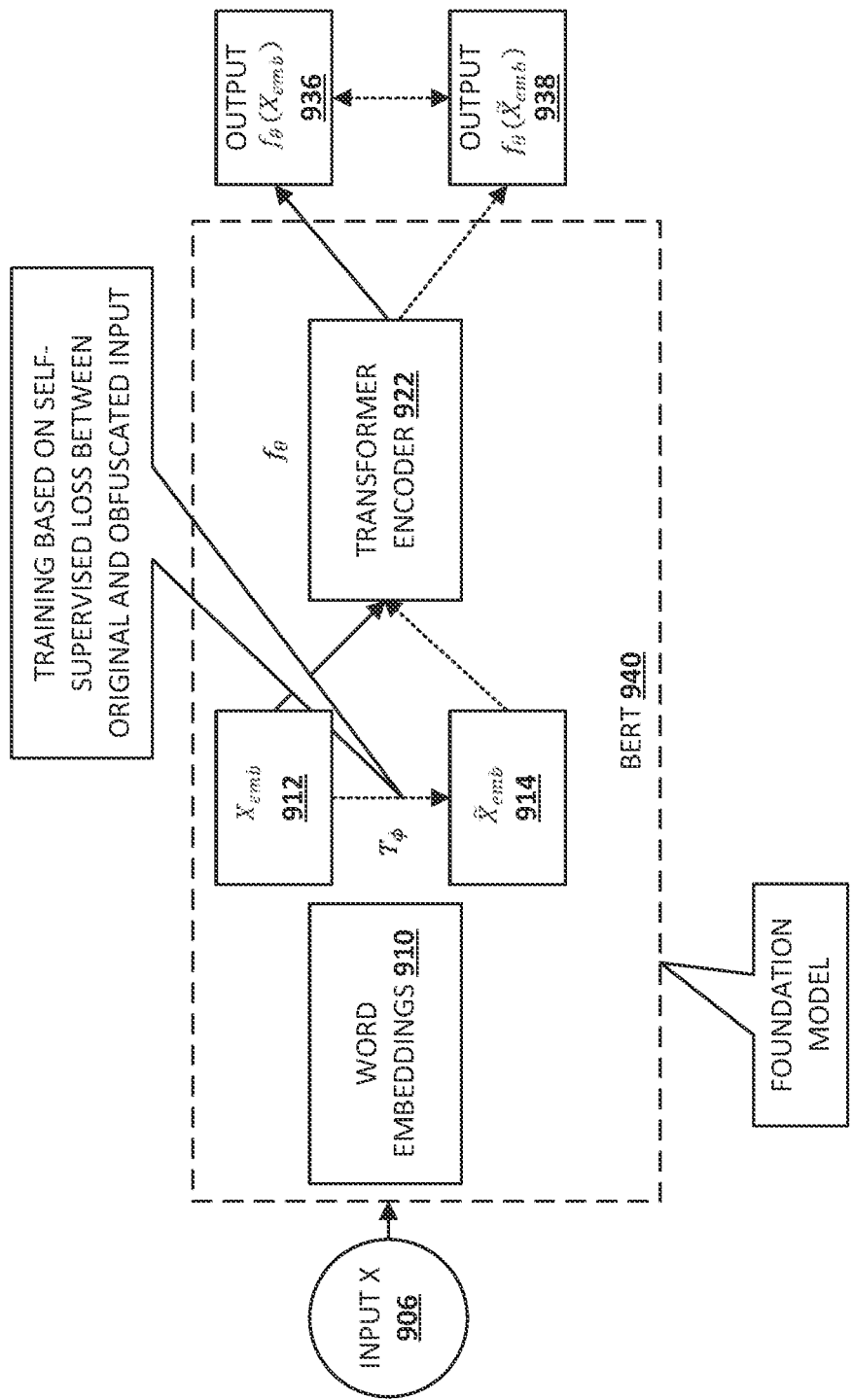
FIG. 9B depicts a system for self-supervised obfuscation applied to a language-based model, in accordance with some embodiments.

FIG. 9B depicts a system for self-supervised obfuscation applied to a language-based model, which may be the language-based model BERT 940. The language-based model may be any appropriate language-based foundation model, such as the language-based model BERT 940, which may be the foundation model $f_\theta$ or contain a foundation model $f_\theta$. The language-based model BERT 940 may contain a word embedding layer 910, which operates to generate embeddings. The language-based foundation model may operate on input X 906. Based on the input X 906, the word embedding layer 910 may generate embeddings $X_{emb}$ 912. A set of obfuscated embeddings $\tilde{X}_{emb}$ 914 may be generated based on a learned transformation $T_\phi$, such that $\tilde{X}_{emb} := T_\phi(X_{emb})$. The set of obfuscated embeddings $\tilde{X}_{emb}$ 914 may protect privacy of information within the input X 906—or that information as rendered in the embeddings $X_{emb}$ 912—such as by application of stochastic noise. The language-based model BERT 940 may operate on the embeddings $X_{emb}$ 912 (or the obfuscated embeddings $\tilde{X}_{emb}$ 914), such as by application of a transformer encoder 922. The transformer encoder 922 may produce an output $f_\theta(X_{emb})$ 936 based on the embeddings $X_{emb}$ 912 and an output $f_\theta(\tilde{X}_{emb})$ 938 based on the obfuscated embeddings $\tilde{X}_{emb}$ 914. Dashed lines in FIG. 9B may represent a flow for obfuscated embeddings. The final representations may be trained based on a self-supervised loss determined based on the original and obfuscated images.

For tabular data, in an example case, a Feature Tokenizer+Transform (FT-Transformer) may be used. The FT-Transformer may be a pretrained foundation model on tabular data. The model may take in standard feature columns, tokenize and convert them to embeddings, and then uses these embeddings as inputs to the Transformer. Thus, the application may be analogous to the language-based model application previously described.

Figure 9C:
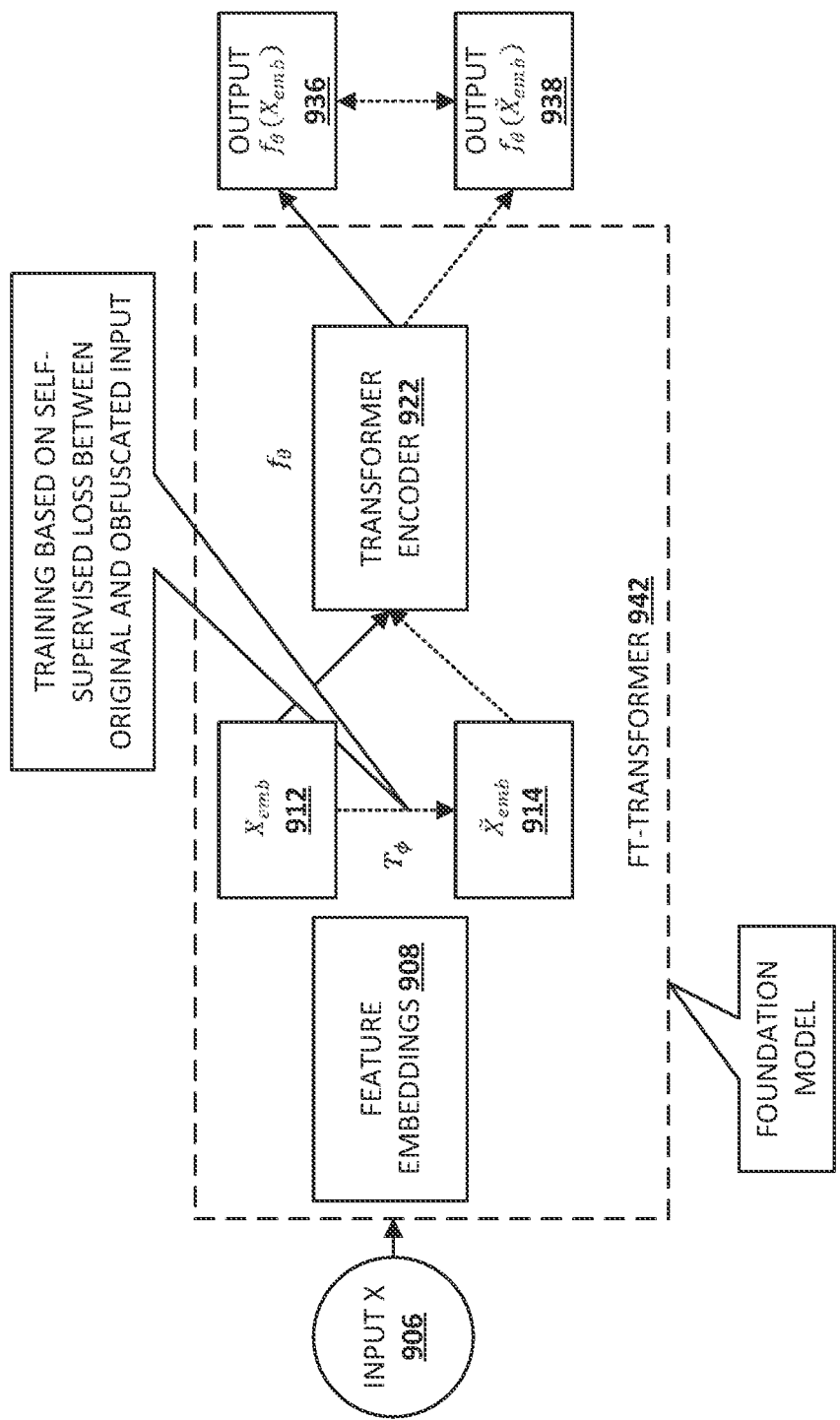
FIG. 9C depicts a system for self-supervised obfuscation applied to a tabular-data-based model, in accordance with some embodiments.

FIG. 9C depicts a system for self-supervised obfuscation applied to a tabular-data-based model, which may be a Feature Tokenizer+Transformer (FT-Transformer 942). The tabular-data-based model may be any appropriate tabular-data-based foundation model, such as the tabular-data-based FT-Transformer 942, which may be the foundation model $f_\theta$ or contain a foundation model $f_\theta$. The FT-Transformer 942 may contain a feature embedding layer 908, which may operate to generate embeddings. The tabular-data-based foundation model may operate on input X 906. Based on the input X 906, the feature embedding layer 908 may generate embeddings $X_{emb}$ 912. A set of obfuscated embeddings $\tilde{X}_{emb}$ 914 may be generated based on a learned transformation $T_\phi$, such that $\tilde{X}_{emb} := T_\phi(X_{emb})$. The set of obfuscated embeddings $\tilde{X}_{emb}$ 914 may protect privacy of information within the input X 906—or that information as rendered in the embeddings $X_{emb}$ 912—such as by application of stochastic noise. The tabular-data-based FT-Transformer 942 may operate on the embeddings $X_{emb}$ 912 (or the obfuscated embeddings $\tilde{X}_{emb}$ 914), such as by application of a transformer encoder 922. The transformer encoder 922 may produce an output $f_\theta(X_{emb})$ 936 based on the embeddings $X_{emb}$ 912 and an output $f_\theta(\tilde{X}_{emb})$ 938 based on the obfuscated embeddings $\tilde{X}_{emb}$ 914. Dashed lines in FIG. 9C may represent a flow for obfuscated embeddings. The final representations may be trained based on a self-supervised loss determined based on the original and obfuscated images.

FIG. 9A-9C depict illustrative examples of application of self-supervised obfuscation to example foundation models. A system of self-supervised obfuscation may be applied to any appropriate foundation model, including ensemble foundation models, distributed foundation models, portions of foundation models, etc.

Figure 10:
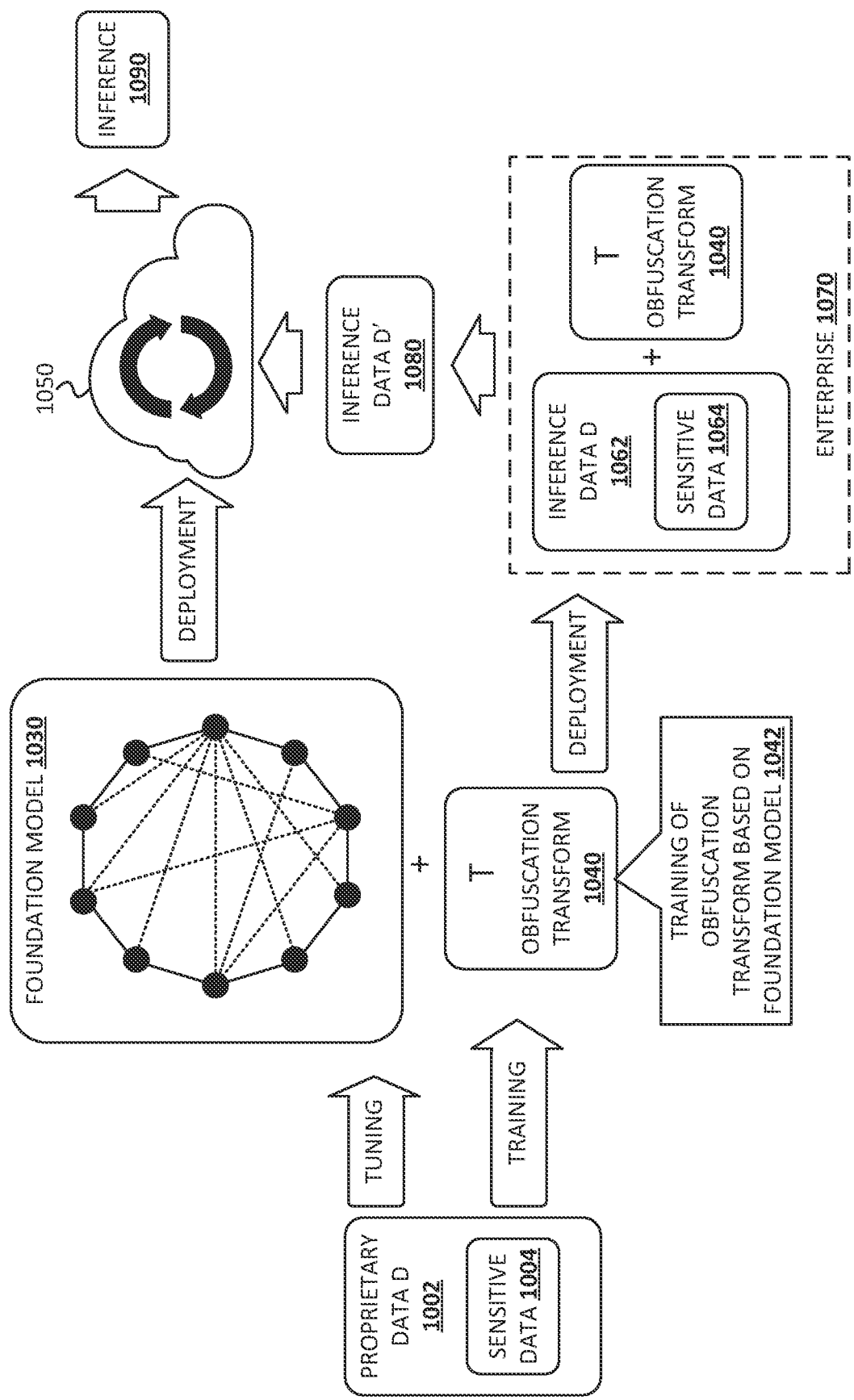
FIG. 10 depicts a system for obfuscation of sensitive data based on a foundation model, in accordance with some embodiments.

FIG. 10 depicts a system for obfuscation of sensitive data based on a foundation model 1030. The foundation model may be any appropriate foundation model 1030. The foundation model 1030 may be a generative artificial intelligence (AI) model. A foundation model may be a model which is trained on a dataset to perform a downstream task. However, a foundation model may be redirected, such as by tuning, to perform a different task than the one for which it was original trained. A foundation model may contain encoded representations of relationships between input data. The foundation model may function to extract features from input data, including features which may not be obviously important to the initial trained task. The foundation model may operate on any appropriate type of input, including multiple types of input. The foundation model may provide an inference, a classification, a prediction, etc. The foundation model may be any appropriate type of model, The foundation model 1030 may be a pre-trained, partially trained, trained, etc. model. The foundation model 1030 may be tuned, where tuning may encompass partial training, re-training, fine tuning, training of the model for a related or unrelated task, etc. The tuning of the foundation model 1030 may be performed based on the original training data set (e.g., the training data set used to create the foundation model) or a subset thereof, or based on a different training data set (which may be a customization training data set).

An entity may have proprietary data D 1002, which may include sensitive data 1004, upon which it wishes to train a model. The proprietary data D 1002 may include data the entity has obtained or purchased and to which it has legal rights, but which may include sensitive data 1004 which the entity is constrained not to reveal. For example, the proprietary data D 1002 may be image data which may contain facial images as sensitive data 1004 which the entity may be legally constrained to protect. The entity may wish to train or tune a foundation model with the proprietary data D 1002. The entity which has the proprietary data D 1002 may not be the entity which has the foundation model 1030. Because foundation models may be trained on large (or relatively large) datasets, creation of foundation models may be expensive. The entity which has the proprietary data D 1002 which may be used to tune an existing foundation model (e.g., foundation model 1030) for a specific task or on proprietary data D 1002, may not be the entity which has the foundation model 1030. In some embodiments, the entity which has the foundation model 1030 may allow access (for example, license) the foundation model 1030 to users. Users of the foundation model may be allowed to tune (or modify in some ways) the foundation model 1030, such as by having access to a specific instance of the foundation model 1030 or by applying additional layers to the foundation model 1030. Users of the foundation model 1030 may be allowed to supply their own prompts (for example, inference data) to the foundation model 1030 or a tuned version of the foundation model. Users of the foundation model, such as the entity having the proprietary data D 1002, may want to protect any sensitive data, such as the sensitive data 1004, from exposure to the entity which operates the foundation model 1030. For example, the entity with the proprietary data D 1002 may wish to obfuscate the sensitive data 1004 before sending training data, inference data, etc. to the foundation model 1030. In some embodiments, the entity which has the proprietary data D 1002 may also be the entity which has the foundation model 1030, or both the proprietary data D 1002 and the foundation model 1030 may be within a security envelope. In some embodiments, the proprietary data D 1002 and the foundation model 1030 may be within the same security envelope for training, but the foundation model may be deployed (such as to a cloud 1050) outside of the security envelope entity with the proprietary data D 1002. In some embodiments, the foundation model may be an ensemble model, such as an ensemble of models deployed in different locations or on different (or the same) processors.

The holder of the proprietary data D 1002 may wish to tune the foundation model 1030 with their proprietary data D 1002. The foundation model 1030 itself may not be held by the holder of the proprietary data D 1002, so the holder of the proprietary data D 1002 may not want to trust sensitive data 1004 to the foundation model 1030. The foundation model 1030 may not be available for training to the holder of the proprietary data D 1002. In some embodiments, self-supervised training of an obfuscation transform 1040 is used to provide privacy to the holder of the proprietary data D 1002 while allowing tuning of the foundation model 1030. In some embodiments, a privacy lay may be added to the proprietary data D 1002 (or other data, such as inference data D 1062) before such data is transmitted to the foundation model 1030.

In some embodiments, the obfuscation transform 1040 may be trained using any appropriate method, such as those previously described (such as in reference to FIGS. 9A-9C). In some embodiments, the obfuscation transform 1040 may be trained based on the foundation model 1042. In some embodiments, the obfuscation transform 1040 may be trained on the foundation model 1030 and the proprietary data D 1002. In some embodiments, the obfuscation transform 1040 may be trained by the holders of the foundation model 1030 and supplied to the holders of the proprietary data D 1002. In some embodiments, the obfuscation transform 1040 may be trained to provide stochastic noise to one or more layers of the foundation model 1030. In some embodiments, the obfuscation transform 1040 may be trained to provide stochastic noise to data input to the foundation model 1030. In some embodiments, the obfuscation transform 1040 may provide stochastic noise to a representation of the data input to the foundation model 1030.

In some embodiments, the entity which has the foundation model 1030 may also or instead which to obfuscate data with is fed into the foundation model 1030. For example, the holder of the foundation model 1030 may be obligated (e.g., legally) to prevent personally identifying information from being run through or incorporated into the foundation model. In another example, the holder of the foundation model 1030 may wish to ensure that a user of the foundation model is not biasing the model—such as by providing prompts (such as through an adversarial attack, by supplying racist prompts, etc.) which may bias the model towards undesired behavior. In some embodiments, the holder of the foundation model 1030 may apply an obfuscation transform 1040 to data or prompts supplied to the foundation model 1030. In some embodiments, the holder of the foundation model 1030 may apply a first obfuscation transform 1040 to the data supplied into the foundation model 1030, such as an obfuscation transform which removed PHI. In some embodiments, the holder of the foundation model 1030 may apply additional obfuscation transforms, such as an obfuscation transform which detects sentiment, analyzes sentiment, adversarial data, etc., while also removing sensitive data from any supplied data. In this manner, the holder of the foundation model 1030 may monitor what is supplied to the foundation model 1030 without breaching the security of the data which is provided as input, and which may be customer data—e.g., an inspection without intrusion. The use of a strong obfuscation transform, such as the obfuscation transform 1040, may comfort customers who want or need to know that their proprietary data, such as the proprietary data D 1002, cannot be extracted from the foundation model 1030 and is not viewable to the holder of the foundation model 1030.

Once the obfuscation transform 1040 is trained, it may be deployed at a secured layer, such as to a location containing inference data D 1062. The inference data D 1062 may be data on which the foundation model 1030, such as as-modified by a user, is to be operated. The inference data D 1062 may contain sensitive data 1064. The obfuscation transform 1040 may be deployed, such as within an enterprise device 1070 (or otherwise within a secure or trusted computation unit, such as on a client device which obtains video recording), such that the sensitive data 1064 is obfuscated from the inference data D 1062 to produce inference data D' 1080, from which private information is removed or otherwise obfuscated. The inference data D' 1080 may then be transmitted to an unsecured or untrusted site, such as to cloud 1050 where a tuned version of the foundation model 1030 operates. The tuned version of the foundation model 1030 may operate on the inference data D' 1080 to produce an inference 1090, which may be an inference of value to the holder of the inference data D 1062, to a customer of the holder of the inference data D 1062, to a user of the foundation model 1030, etc.

Figure 11:
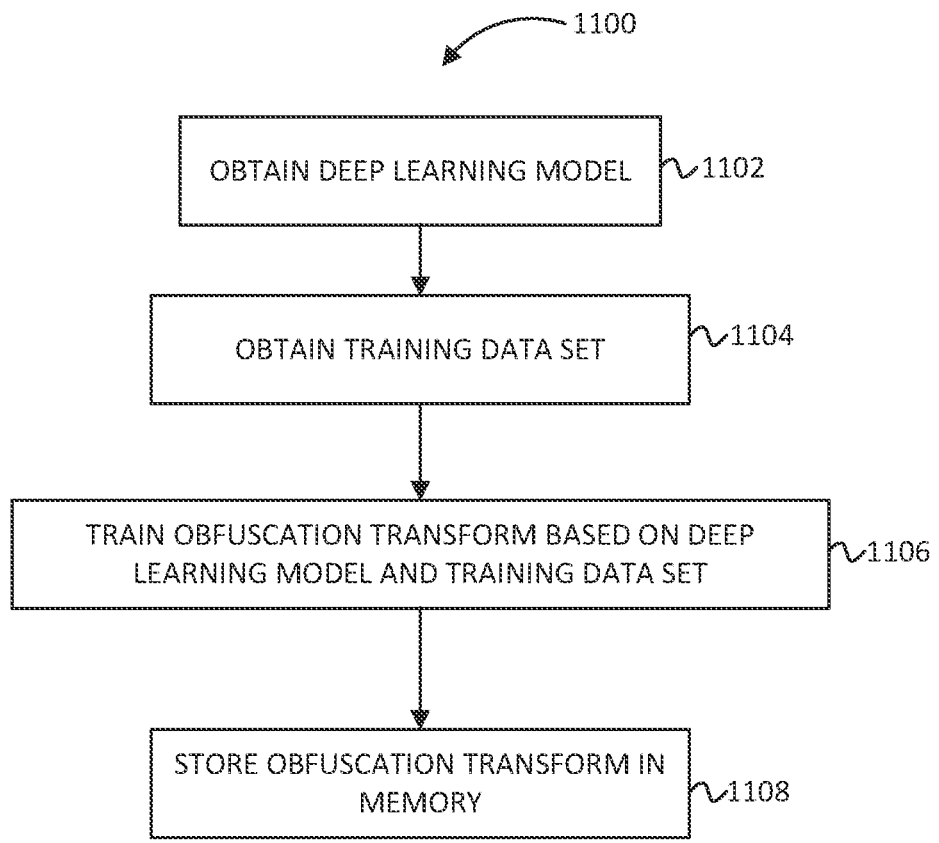
FIG. 11 illustrates an exemplary method for data obfuscation with a foundation model, in accordance with some embodiments.

FIG. 11 illustrates an exemplary method 1100 for data obfuscation with a foundation model. Each of these operations is described in detail below. The operations of method 1100 presented below are intended to be illustrative. In some embodiments, method 1100 may be accomplished with one or more additional operations not described, and/or without one or more of the operations discussed. Additionally, the order in which the operations of method 1100 are illustrated in FIG. 1 and described below is not intended to be limiting. In some embodiments, one or more portions of method 1100 may be implemented (e.g., by simulation, modeling, etc.) in one or more processing devices (e.g., one or more processors). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100, for example. For illustrative purposes, optional operations are depicted with dashed lines. However, operations which are shown with unbroken lines may also be optional or may be omitted.

At an operation 1102, a deep learning model is obtained. The deep learning model may be a foundation model. The deep learning model may be a generative AI model. The deep learning model may be any appropriate deep learning model. The deep learning model may encoded data into representations which may correspond to features of the encoded data. The deep learning model may be an ensemble model. The deep learning model may be a trained model, a pre-trained model, a partially trained model, etc. The deep learning model may be available to tune, where tuning may consist of additional training, re-training, fine tuning of training, training of the deep learning model to instead or additionally accomplish a new task (e.g., in instead of or in addition to the task for which it was originally trained). The deep learning model may be obtained from storage. The deep learning model may be obtained from a holder of the deep learning model. The training data used to generate the deep learning model may or may not be available. The deep learning model may be maintained by a separate entity. For example, the hidden layers of the deep learning model may or may not be available. The deep learning model may operate on an untrusted processor or storage (e.g., outside of an entity's firewall, control, cloud, etc.). The deep learning model may function as a black box, which received inputs and produces outputs. The deep learning model may be trained using supervision. The deep learning model may be a large data model.

At an operation 1104, a training data set is obtained. The training data set may be proprietary data—that may be held by an entity that is or is not the holder of the deep learning model. The training data set may include sensitive information, which may be required to be held private (e.g., obfuscated). The training data set may be any appropriate data, such as image data, language data, tabular data, etc. The training data set may comprise multiple types of data. The training data set may be the same as or different from the training data used to create the deep learning model. The training data set may contain labels.

At an operation 1106, an obfuscation transform is trained based on the deep learning model and the training data set. The obfuscation transform may be trained using self-supervision. The obfuscation transform may be trained based on an optimization function, such as an optimization function which minimized mutual information between elements of the training data set and obfuscated data and maximizes performance of the deep learning model. The obfuscation transform may be applied to the training data set. The obfuscation transform may be applied to an encoded representation of the training data set. The obfuscation transform may be applied to the deep learning model, such as an additional layer between input and the deep learning model. The obfuscation transform may be applied to a hidden layer of the deep learning model. The obfuscation transform may be trained before, after, or simultaneously with tuning of the deep learning model.

At an operation 1108, the obfuscation transform may be stored in memory. Parameters of the obfuscation transform may be stored. The obfuscation transform may be stored with the deep learning model, with a tuned version of the deep learning model, in a data-side storage location, with the training data, etc. The obfuscation transform may be integrated into the deep learning model, into a tuned version of the deep learning model, into data collection apparatus, etc.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In this patent filing, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques may be better understood with reference to the following enumerated embodiments:

1. A tangible, non-transitory, machine-readable medium storing instructions that when executed by one or more processors effectuate operations comprising: obtaining, by a computer system, a dataset; training, with the computer system, one or more machine learning models as an autoencoder to generate as output a reconstruction of a record in the dataset based on an input of the record in the dataset, wherein the autoencoder comprises a deterministic layer and wherein training is based on optimization of a value indicative of reconstruction loss; adding, with the computer system, one or more stochastic noise layers to the trained one or more machine learning models of the autoencoder; adjusting, with the computer system, parameters of the stochastic noise layers according to an objective function that is differentiable; and storing, with the computer system, the one or more machine learning models of the autoencoder with the stochastic noise layers in memory.

2. A tangible, non-transitory, machine-readable medium storing instructions that when executed by one or more processors effectuate operations comprising: obtaining, by a computer system, a machine learning model; obtaining, by the computer system, a training data set; training, by the computer system, an obfuscation transform based on the machine learning model and the training data set by self-supervision; and storing, with the computer system, the trained obfuscation transform in memory.

3. The medium of embodiment 2, wherein the machine learning model is a generative artificial intelligence (AI) model trained with self-supervision, and the trained obfuscation transform is configured to transform records into obfuscated records that are correctly processed by the machine learning model despite the obfuscation.

4. The medium of embodiment 2, wherein the machine learning model is a foundation model, where the foundation model is operative to perform a plurality of tasks at inference time with capabilities that emerged during training and were not explicitly measured by an objective function used to train the foundation model.

5. The medium of any one of embodiments 2 to 4, wherein training the obfuscation transform comprises: adding an obfuscation transform to at least one of the training data set and the machine learning model; and adjusting parameters of the obfuscation transform according to an objective function that is differentiable.

6. The medium of any one or embodiments 2 to 5, wherein the obfuscation transform comprises a stochastic noise layer and wherein training the obfuscation transform comprises determining parameters of distribution of stochastic noise of the stochastic noise layer.

7. The medium of embodiment 6, wherein the stochastic noise layer is applied to input into the machine learning model.

8. The medium of embodiment 6, wherein the stochastic noise layer is applied to input into a layer of the machine learning model.

9. The medium of embodiment 8, wherein the stochastic noise layer is applied to embedded values within the machine learning model.

10. The medium of any one of embodiments 6 to 9, wherein the trained obfuscation transform is configured to obfuscate data designated as being sensitive.

11. The medium of any one of embodiments 2 to 10, wherein the machine learning model is an ensemble model; the machine learning model comprises an image-based model, language-based model, or tabular-data-based model; the machine learning model is at least one of an inference model, a classification model, a prediction model, or a transformer; the obfuscation transform is applied to at least a portion of the ensemble model; and the obfuscation transform is trained by optimization of an objective function, the objective function minimizing mutual information and minimizing data loss.

12. The medium of any one of embodiments 2 to 11, further comprising tuning the machine learning model based on the training data set.

13. The medium of embodiment 12, further comprising deploying the tuned machine learning model.

14. The medium of any one of embodiments 2 to 13, further comprising applying the stored obfuscation transform to a set of production data.

15. The medium of embodiment 14, wherein the stored obfuscation transform is applied to the set of production data to generate obfuscated data and wherein the obfuscated data is input into the machine learning model.

16. The medium of embodiment 15, wherein the stored obfuscation transform is applied to the set of production data before the set of production data is transmitted to the machine learning model.

17. The medium of embodiment 15, wherein the stored obfuscation transform is applied to the set of production data after the production data is transmitted to the machine learning model.

18. The medium of any one of embodiments 2 to 17, further comprising steps for deploying the obfuscation transform to a production dataset.

19. The medium of any one of embodiments 2 to 18, further comprising steps for obfuscating a data set based on the obfuscation transform.

20. A method comprising: obtaining, with a computer system, a machine learning model; obtaining, with the computer system, a training data set; training, with the computer system, an obfuscation transform based on the machine learning model and the training data set; and storing, with the computer system, the obfuscation transform in memory.

21. The medium of embodiment 6, wherein the stochastic noise layer is a bottleneck layer.

22. The medium of embodiment 10, wherein designating data as being sensitive comprises designating data elements to be transformed which are not reconstructable when transformed.

23. The medium of embodiment 10, wherein obfuscating data designated as being sensitive comprises applying noise regularization to the data designated as being sensitive.

24. A tangible, non-transitory, machine-readable medium storing instructions that when executed by one or more processors effectuate operations comprising: obtaining, by a computer system, a dataset; training, with the computer system, one or more machine learning models as an encoder to generate as output a reconstruction of a record in the dataset based on an input of the record in the dataset, wherein the encoder comprises a deterministic layer and wherein training is based on optimization of a value indicative of reconstruction loss; adding, with the computer system, one or more stochastic noise layers to the trained one or more machine learning models of the encoder; adjusting, with the computer system, parameters of the stochastic noise layers according to an objective function that is differentiable; and storing, with the computer system, the one or more machine learning models of the autoencoder with the stochastic noise layers in memory.

25. The medium of embodiment 25, wherein the objective function comprises a noise regularization term.

26. The medium of embodiment 25, wherein the objective function comprises an adversarial term.

27. The medium of embodiment 26, wherein the adversarial term is a measure of another model's ability to reconstruct the record in the dataset from the reconstruction of the record in the dataset produced by the autoencoder with the stochastic noise layers.

28. A tangible, non-transitory, machine-readable medium storing instructions that when executed by one or more processors effectuate operations comprising: obtaining, by a computer system, a trained machine learning model; training, with the computer system, an obfuscation layer based on the trained machine learning model, wherein the training is self-supervised; and storing, with the computer system, parameters of the obfuscation layer in memory.

29. The medium of embodiment 28, further comprising obfuscating a record of a dataset by applying the obfuscation layer.

30. The medium of embodiment 29, wherein the obfuscation layer preserves a distance in latent space between records.

The invention claimed is:

1. A tangible, non-transitory, machine-readable medium storing instructions that when executed by one or more processors effectuate operations comprising:
   obtaining, by a computer system, a training dataset;
   training, with the computer system, one or more machine learning models as an autoencoder to generate as output a reconstruction of a record in the training dataset based on an input of the record in the training dataset, wherein the autoencoder comprises at least one deterministic layer and wherein training is based on optimization of a value indicative of reconstruction loss and wherein the record is multi-dimensional;
   adding, with the computer system, one or more stochastic noise layers to the trained one or more machine learning models of the autoencoder,
      wherein the one or more stochastic noise layers are additional layers among the layers of the trained one or more machine learning models of the autoencoder,
      wherein each of the stochastic noise layers inject noise by, for each of at least a plurality of dimensions of the stochastic noise layer, sampling from a parametric noise distribution for respective dimensions, and adding for each stochastic noise layer, noise to an encoded representation of a record at the respective stochastic noise layer, and
      wherein the parametric noise distributions for each of the at least the plurality of dimensions are independent;
   adjusting, with the computer system, parameters of the parametric noise distributions for the dimensions of the one or more stochastic noise layers according to an objective function that is differentiable, wherein the objective function comprises a measure of adversarial loss;
   storing, with the computer system, the one or more machine learning models of the autoencoder with the stochastic noise layers in memory;
   obtaining, by the computer system, one or more records from a second dataset;
   generating, with the stored one or more machine learning models of the autoencoder with the stochastic noise layers, one or more obfuscated records for the one or more records from the second dataset; and
   transmitting, by the computer system, the one or more obfuscated records by an untrusted network.

2. The medium of claim 1,
   wherein the objective function further comprises a measure of reconstruction loss and a measure of noise loss,
   wherein the measure of noise loss is tunable,
   wherein the training dataset contains sensitive data,
   wherein the one or more obfuscated records do not contain sensitive data,
   wherein the second dataset is a dataset of a second machine learning model, the second machine learning model trained based on the second dataset, and the one or more obfuscated records of the second dataset transmitted to the second machine learning model by the untrusted network,
   wherein the second machine learning model trained on the second dataset has accuracy relative to a third machine learning model trained on the training dataset containing sensitive data to within a threshold metric, and
   wherein the parametric noise distributions for the one or more stochastic noise layers are not adjusted based on the one or more records from the second dataset.

3. the medium of claim 1, wherein a stochastic noise layers is a layer added between two of the layers of the trained one or more machine learning models of the autoencoder, the stochastic noise layer having substantially the same dimensionality as at least one of the adjacent layers of the trained one or more machine learning models of the autoencoder, the stochastic noise layer injecting, for a respective dimension of a respective record at the stochastic noise layer, a noise value, the noise value sampled from a parametric noise distribution trained for the respective dimension of the stochastic noise layer, and wherein the sampling from the parametric noise distribution is at least pseudorandom.

4. The medium of claim 1, wherein injecting noise comprises, for each of the at least the plurality of dimensions, selecting a noise value based on the sampling from the parametric noise distribution and at least one of adding the noise value, multiplying by the noise value, subtracting the noise value, division by the noise value, or a combination thereof for a value of the dimension of the encoded representation of the record at the respective stochastic noise layer.

5. The medium of claim 1, wherein the training dataset and the second dataset comprise images and wherein injecting noise comprises changing a pixel value for a dimension of the image by a noise value, the noise value selected from the parametric noise distribution.

6. The medium of claim 1,
   wherein the one or more machine learning models comprises a language-based model,
   wherein the training dataset and the second dataset comprise text files, and
   wherein each of the stochastic noise layers inject noise by, for each of the at least the plurality of dimensions of a respective record at the stochastic noise layer, sampling from the parametric noise distribution for the respective dimension and adding a noise value to the encoded representation of the record at the respective stochastic noise layer, the noise value selected from the parametric noise distribution.

7. The medium of claim 1, further comprising identifying one or more layers or nodes of the one or more machine learning models which are substantially non-contributing based on the parametric noise distribution for a respective dimension at a respective stochastic noise layer and compressing the one or more machine learning models by pruning the one or more layers or nodes.

8. The medium of claim 1, further comprising:
   identifying a first subset of one or more features of a record or embedding which are substantially non-contributing based on the parametric noise distributions having values over a first threshold for a respective dimension at a respective stochastic noise layer;
   wherein generating the one or more obfuscated records comprises pruning, from the one or more records of the second dataset, the one or more substantially non-contributing features.

9. A tangible, non-transitory, machine-readable medium storing instructions that when executed by one or more processors effectuate operations comprising:
   obtaining, by a computer system, a access to a machine learning model, wherein the machine learning model is a trained machine learning model, wherein the machine learning model is a foundation model, and wherein the machine learning model generates embeddings based on input records;

obtaining, by the computer system, a training data set;

determining, by the computer system, an obfuscation transform based on the machine learning model and the training data set by self-supervision, wherein determining the obfuscation transform comprises:

obtaining training embeddings based on the training set from the machine learning model;

generating the obfuscation transform based on dimensionality of the training embeddings, wherein the obfuscation transform injects noise by, for each of at least a plurality of dimensions of the training embedding, sampling from a parametric noise distribution and applying the sampled parametric noise to a given embedding;

training the obfuscation transform by adjusting parameters of the parametric noise distribution according to an objective function that is differentiable, wherein the object function comprises a measure of mutual information and a measure of data loss; and storing, with the computer system, the trained obfuscation transform in memory.

10. The medium of claim 9, wherein the machine learning model is a generative artificial intelligence (AI) model trained with self-supervision, and the trained obfuscation transform is configured to transform records into obfuscated embeddings that are correctly processed by the machine learning model despite the obfuscation transform.

11. The medium of claim 9, wherein the foundation model is operative to perform a plurality of tasks at inference time with capabilities that emerged during training and were not explicitly measured by an objective function used to train the foundation model.

12. The medium of claim 9, the operations further comprising:

applying the trained obfuscation transform to at least one of a production data set and within the machine learning model, wherein the obfuscation transform generates an obfuscated embedding based on an input record, and wherein adjusting parameters of the objective function comprises optimizing the objecting function by minimizing mutual information between records of the training data set and obfuscated embeddings corresponding to the training embeddings and minimizing data loss between the records of the training data set and the obfuscated embeddings corresponding to the training embeddings.

13. The medium of claim 9, wherein the obfuscation transform comprises a stochastic noise layer of substantially the same dimensionality as the training embeddings, wherein the stochastic noise layer injects noise independently for each of the at least the plurality of dimensions of the given embedding, and wherein training the obfuscation transform comprises determining parameters of distribution of stochastic noise for each of the dimensions of the stochastic noise layer.

14. The medium of claim 9, the instructions further comprising steps to apply the obfuscation transform to input into the machine learning model, wherein the input comprises records from a production data set and wherein the machine learning model performs an inference on the obfuscated input.

15. The medium of claim 9, the instructions further comprising steps to apply the obfuscation transform as a layer within the machine learning model, wherein the machine learning model is configured to perform an inference on input data.

16. The medium of claim 15, wherein the obfuscation transform is applied to embeddings corresponding to the input data within the machine learning model, where the input data comprises records from a production data set and wherein the machine learning model performs the inference based on the obfuscated embeddings corresponding to the input data.

17. The medium of claim 9, wherein the training set comprises sensitive data, wherein the sensitive data comprises at least one of facial image data, protected health information, and a combination thereof, and wherein the trained obfuscation transform is configured to obfuscate sensitive data in the training data set.

18. The medium of claim 9, wherein
the machine learning model is an ensemble model;
the machine learning model comprises an image-based model, language-based model, or tabular-data-based model;
the machine learning model is at least one of an inference model, a classification model, a prediction model, or a transformer; and
the obfuscation transform is applied to at least a portion of the ensemble model.

19. The medium of claim 9, further comprising tuning the machine learning model to perform an inference task based on the training data set and a second objective function that is differentiable.

20. The medium of claim 19, further comprising deploying the tuned machine learning model, wherein the tuned machine learning model is a distributed model and wherein a portion of the tuned machine learning model is deployed to a trusted network and wherein a portion of the tuned machine learning model is distributed to an untrusted network.

21. The medium of claim 9, further comprising:
obtaining one or more records from a production data set;
generating, with the stored obfuscation transform, obfuscated embeddings based on the production data set;
transmitting the obfuscated embeddings corresponding to the production data set to the machine learning model by a network, and
performing an inference on the obfuscated embeddings corresponding to the production data set by the machine learning model,
wherein the production data set comprises sensitive data, and
wherein the obfuscated embeddings corresponding to the production data set do not comprise sensitive data.

22. The medium of claim 21, wherein the stored obfuscation transform is applied to the production data set before the set of production data is transmitted to the machine learning model and wherein the network comprises an untrusted network.

23. The medium of claim 21, wherein the stored obfuscation transform is applied to the production data set after the production data is transmitted to the machine learning model and wherein the sensitive data comprises data that biases the machine learning model.

24. The medium of claim 9, further comprising steps for obfuscating a production data set based on the obfuscation transform.

25. The medium of claim 9, wherein the objective function further comprises a measure of adversarial loss.

26. The medium of claim 9, wherein the objective function further comprises a measure of adversarial attack, the measure of adversarial attack determined based on a sensitive attribute classifier applied to obfuscated embeddings.

27. The medium of claim 9,
wherein the foundational model is a language-based model,
wherein the embeddings are embeddings generated based on natural language text of an input to the foundation model, and
wherein the obfuscation transform is applied at a hidden layer in the foundational model.

28. A method comprising:
obtaining, with a computer system, a access to machine learning model, wherein the machine learning model is a trained machine learning model, wherein the machine learning model is a foundation model, and wherein the machine learning model generates embeddings based on input records;
obtaining, with the computer system, a training data set, the training set containing sensitive data;
determining, with the computer system, an obfuscation transform based on the machine learning model and the training data set, wherein determining the obfuscation transform comprises:
 obtaining training embeddings based on the training set from the machine learning model;
 generating the obfuscation transform based on dimensionality of the training embeddings, wherein the obfuscation transform injects noise by, for each of at least a plurality of dimensions of the training embedding, sampling from a parametric noise distribution and applying the sampled parametric noise to a given embedding;
 training the obfuscation transform by adjusting parameters of the parametric noise distribution according to an objective function that is differentiable, wherein the object function comprises a measure of mutual information and a measure of data loss; and
storing, with the computer system, the obfuscation transform in memory.

29. A method comprising:
obtaining, by a computer system, a training dataset of images;
training, with the computer system, a machine learning models as an multi-layer autoencoder to generate as output a reconstruction of an image in the training dataset based on an input of the image in the training dataset, wherein the autoencoder comprises at least one deterministic layer and wherein training is based on optimization of a value indicative of reconstruction loss and wherein the image is multi-dimensional;
adding, with the computer system, a stochastic noise layer to the autoencoder layer corresponding to a encoded representation of the image within trained layers of the multi-layer autoencoder, the stochastic noise layer having substantially the same dimensionality as the encoded representation of the image, each of at least a plurality of dimensions of the stochastic noise layer comprising a parametric distribution having a mean and a dispersion,
 wherein the stochastic noise layer injects noise to the encoded representation of the image at each of the at least the plurality of dimensions of the encoded representation of the image by sampling a noise value from the corresponding parametric noise distribution and convolving the sampled noise value with a value of the encoded representation for a respective dimension, and
 wherein the parametric noise distributions for each of the at least the plurality of dimensions are independent;
adjusting, with the computer system, the mean and deviation of the parametric noise distributions for each of the at least the plurality of dimensions of the stochastic noise layer according to an objective function that is differentiable, wherein the objective function comprises a measure of adversarial loss, an adjustable noise tuning parameter, and a reconstruction loss until a termination criterion is satisfied;
storing, with the computer system, the autoencoder with the stochastic noise layer comprising the adjusted parametric noise distributions in memory;
obtaining, by the computer system, one or more images in a production data set;
generating, with the stored autoencoder with the stochastic noise layers, one or more obfuscated image based on the one or more images in the production data set; and
transmitting, by the computer system, the one or more obfuscated images by an untrusted network to an inference model; and
obtaining, by the computer system, an output from the inference model based on the one or more obfuscated images.

* * * * *